(12) United States Patent
Shivananda et al.

(10) Patent No.: US 9,047,168 B2
(45) Date of Patent: Jun. 2, 2015

(54) AUTOMATICALLY GENERATING DOCUMENTATION FOR A DIAGRAM INCLUDING A PLURALITY OF STATES AND TRANSITIONS

(75) Inventors: Praveen Shivananda, Bangalore (IN); Ritesh Kumar Soni, Tezpur (IN); Nicholas G. Neumann, Round Rock, TX (US)

(73) Assignee: National Instruments Corporation, Austin, TX (US)

( * ) Notice: Subject to any disclaimer, the term of this patent is extended or adjusted under 35 U.S.C. 154(b) by 784 days.

(21) Appl. No.: 12/465,778

(22) Filed: May 14, 2009

(65) Prior Publication Data

US 2010/0293480 A1  Nov. 18, 2010

(51) Int. Cl.
*G06F 3/00* (2006.01)
*G06F 9/44* (2006.01)

(52) U.S. Cl.
CPC ........................................ *G06F 8/73* (2013.01)

(58) Field of Classification Search
USPC .......................................................... 715/760
See application file for complete search history.

(56) References Cited

U.S. PATENT DOCUMENTS

| | | | |
|---|---|---|---|
| 4,914,568 A | 4/1990 | Kodosky et al. | |
| 5,452,206 A | 9/1995 | Turrietta et al. | |
| 5,825,356 A | 10/1998 | Habib et al. | |
| 5,918,233 A | 6/1999 | La Chance et al. | |
| 5,953,526 A | 9/1999 | Day et al. | |
| 5,974,257 A | 10/1999 | Austin | |
| 6,219,628 B1 | 4/2001 | Kodosky et al. | |
| 6,389,481 B1 | 5/2002 | Malcolm | |
| 6,452,607 B1 | 9/2002 | Livingston | |
| 6,779,155 B1 * | 8/2004 | Bahrs et al. | 715/234 |
| 6,788,313 B1 | 9/2004 | Heil | |
| 6,799,198 B1 | 9/2004 | Huboi et al. | |
| 6,943,466 B2 | 9/2005 | Oohashi | |
| 6,981,207 B1 | 12/2005 | Bakman et al. | |
| 6,996,769 B1 | 2/2006 | Peikes et al. | |
| 7,016,062 B2 | 3/2006 | Ishizuka | |
| 7,114,149 B2 | 9/2006 | Aptus et al. | |
| 7,162,387 B2 | 1/2007 | Johnson et al. | |
| 7,188,336 B2 | 3/2007 | Humphries | |
| 7,200,838 B2 | 4/2007 | Kodosky et al. | |

(Continued)

OTHER PUBLICATIONS

"State Machine Editors User Manual", Sep. 18, 2008. 186 pages.*

(Continued)

*Primary Examiner* — Omar Abdul-Ali
*Assistant Examiner* — Haimei Jiang
(74) *Attorney, Agent, or Firm* — Meyertons Hood Kivlin Kowert & Goetzel, P.C.; Jeffrey C. Hood; Joel L. Stevens

(57) ABSTRACT

System and method for generating documentation for a diagram including states and transitions. The diagram may be received or otherwise stored and may specify a plurality of states and a plurality of transitions between the states. The first diagram also specifies first functionality. User documentation may be automatically generated for the first diagram based on the first diagram. The user documentation may describe the first diagram, e.g., the plurality of states and the plurality of transitions of the first diagram. Automatic generation of the user documentation may be performed without manual user input specifying the user documentation. The user documentation may be displayed on a display and/or stored in a memory medium.

27 Claims, 33 Drawing Sheets

(56) References Cited

U.S. PATENT DOCUMENTS

| | | | |
|---|---|---|---|
| 7,210,117 B2 | 4/2007 | Kudukoli et al. | |
| 7,503,027 B1* | 3/2009 | Zhao et al. | 716/104 |
| 7,836,012 B1* | 11/2010 | Nevill-Manning et al. | 707/602 |
| 7,941,438 B2* | 5/2011 | Molina-Moreno et al. | 707/756 |
| 2002/0064267 A1* | 5/2002 | Martin et al. | 379/201.01 |
| 2002/0091993 A1 | 7/2002 | Walley et al. | |
| 2002/0165717 A1* | 11/2002 | Solmer et al. | 704/256 |
| 2003/0014439 A1* | 1/2003 | Boughannam | 707/513 |
| 2003/0171908 A1* | 9/2003 | Schilp et al. | 703/16 |
| 2003/0229608 A1 | 12/2003 | Reynar et al. | |
| 2004/0006480 A1 | 1/2004 | Ehlen et al. | |
| 2004/0139073 A1 | 7/2004 | Bauchot et al. | |
| 2005/0144595 A1 | 6/2005 | McLean et al. | |
| 2005/0216891 A1 | 9/2005 | Sundararajan et al. | |
| 2006/0059165 A1* | 3/2006 | Bosloy et al. | 707/10 |
| 2006/0059423 A1 | 3/2006 | Lehmann et al. | |
| 2006/0064292 A1* | 3/2006 | Clune | 703/17 |
| 2006/0079752 A1 | 4/2006 | Anderl et al. | |
| 2006/0150090 A1 | 7/2006 | Swamidass et al. | |
| 2006/0259861 A1 | 11/2006 | Watson | |
| 2006/0265232 A1 | 11/2006 | Katariya et al. | |
| 2007/0009161 A1* | 1/2007 | Hollingsworth | 382/229 |
| 2007/0150859 A1 | 6/2007 | Kodosky et al. | |
| 2007/0214427 A1 | 9/2007 | Peck et al. | |
| 2007/0239628 A1 | 10/2007 | Peck et al. | |
| 2008/0263463 A1 | 10/2008 | Neumann | |
| 2008/0263512 A1 | 10/2008 | Dellas et al. | |
| 2008/0263515 A1 | 10/2008 | Dellas et al. | |
| 2009/0179921 A1* | 7/2009 | Raghavan et al. | 345/689 |

OTHER PUBLICATIONS

Microsoft Notepad Version 5.1, copyright 1981-2001 by the Microsoft Corporation. See Files notepad.pdf, notepad1.pdf, and notepad2.pdf for screenshots. 3 pages.

Microsoft Office Word Verison 11.8134.8132, copyright 1983-2003 by the Microsoft Corporation. See Files Wordopentext2.pdf and Wordopentext4.pdf for screenshots. 2 pages.

IBM, "Algorithm for a Documentation Publishing System Preprocessor", Nov. 1, 1992, vol. 35, Issue 6, Disclosure Text. TBD-ACC-NO: NN9211201. 2 pages.

"Report Generator for Use with MATLAB and Simulink—User's Guide Version 1"; The Mathworks; Jan. 1999; 367 pages.

"Code Documentation Generator for .NET"; NDoc—.NET Code Documentation Generator; Retrieved from the Internet: http://ndoc.sourceforge.net/usersguide.html; Feb. 2, 2007; 1 page.

"What's new in NDoc 1.3?"; NDoc—.NET Code Documentation Generator; Retrieved from the Internet: http://ndoc.sourceforge.net/usersguide.html; Feb. 2, 2007; 7 page.

"Known Issues"; NDoc—.NET Code Documentation Generator; Retrieved from the Internet: http://ndoc.sourceforge.net/usersguide.html; Feb. 2, 2007; 2 page.

"Getting Started"; NDoc—.NET Code Documentation Generator; Retrieved from the Internet: http://ndoc.sourceforge.net/usersguide.html; Feb. 2, 2007; 2 page.

"Decorating Your Code"; NDoc—.NET Code Documentation Generator; Retrieved from the Internet: http://ndoc.sourceforge.net/usersguide.html; Feb. 2, 2007; 1 page.

"Tags Supported by NDoc"; NDoc—.NET Code Documentation Generator; Retrieved from the Internet: http://ndoc.sourceforge.net/usersguide.html; Feb. 2, 2007; 2 page.

"Attributes supported by NDoc"; NDoc—.NET Code Documentation Generator; Retrieved from the Internet: http://ndoc.sourceforge.net/usersguide.html; Feb. 2, 2007; 2 page.

"Creating an NDoc Project"; NDoc—.NET Code Documentation Generator; Retrieved from the Internet: http://ndoc.sourceforge.net/usersguide.html; Feb. 2, 2007; 2 page.

U.S. Appl. No. 60/913,028, entitled "Configuring and Debugging a Statechart", by Nicholas G. Neumann and Toga Hartadinata, filed Apr. 20, 2007, 59 pages.

"SCXML"; Wikipedia; Obtained from Internet: <http://en.wikipedia.org/wiki/SCXML>; Jul. 30, 2010; 2 pages.

"Simulink Report Generator 3 User's Guide"; Matlab and Simulink, The Mathworks: Accelerating the pace of engineering and science; 1999-2010; 374 pages.

\* cited by examiner

*82
computer system*

*computer system
82*

*computer system
90*

Statechart Description

*For the tutorial that accompanies this example statechart, refer to the <b>Statechart Module Tutorial Part 6: Splitting and Merging Transition Segments</b> topic in the LabVIEW help.*

FIG. 6

Statechart Type Definitions

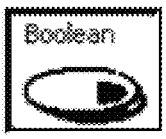

FIG. 7

Trigger List

| ALL | Increment, Menu, Pause, Play, Return, Stop |

FIG. 8

Code Generation Properties

| Execution Target | | Desktop |
|---|---|---|
| Usage | | Asynchronous |
| Queue Settings | Type | LV Queue |
| | Size | -1 |
| | Enqueue timeout in ms | -1 |
| Internal trigger queue size | | 10 |
| Reset output values after each iteration | | TRUE |

FIG. 9

A Initial

Initial

| Description | - |
|---|---|
| Destination | *Transition ->Menu* |
| Containing Region | *Main Diagram* |

| Description | |
|---|---|
| Source | Play ->Transition, Initial ->Transition, Join ->Transition |
| Destination | Transition ->Play, Transition ->Terminal |
| Containing Region | Main Diagram |
| Entry Action | Description | |
| | Action | Code | Inputs / Outputs / Menu -> Outputs Current Activity |
| | Disable | FALSE |
| | AutoPreAllocate | FALSE |
| Exit Action | Description | |

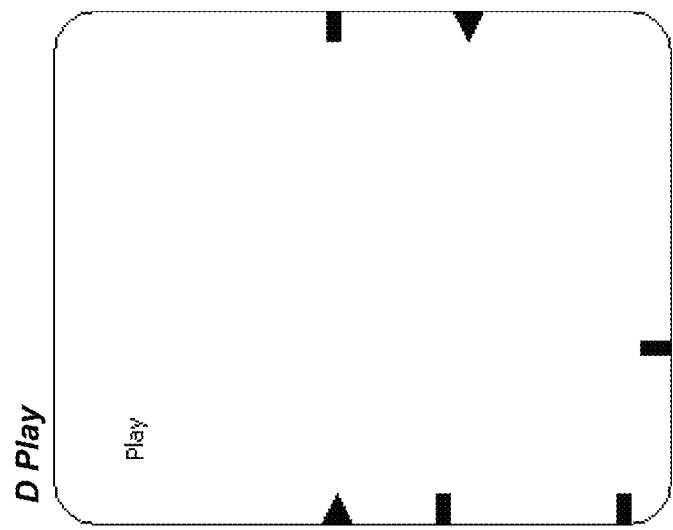

FIG. 14C

D.1 Concurrent

| Description | - |
|---|---|
| Containing State | *Play* |
| Contained Objects | *Initial*, *Red*, *Green* |
| Contained Transitions | *Transition*, *Transition*, *Transition* |

D.1.A Initial
Initial

| Description | - |
|---|---|
| Destination | *Transition ->Red* |
| Containing Region | *Concurrent* |

D.1.B Red

| Description | |
|---|---|
| Source | Initial ->Transition, Green ->Transition |
| Destination | Transition ->Green |
| Containing Region | Concurrent |
| Entry Action | Description |
| | Action Code |
| | Inputs |
| | Outputs |
| | Red -StateData Color |
| Disable | FALSE |
| AutoPreAllocate | FALSE |
| Exit Action | Description |

D.1.C Green

| Description | - |
|---|---|
| Source | Fork, Red ->Transition |
| Destination | Join, Transition ->Red |
| Containing Region | Concurrent |

D.1.F Transition

| Description | - |
|---|---|
| Source | Green |
| Destination | Red |
| Containing Region | Concurrent |
| Trigger List | Return |

D.2 Tick Counter

| Description | - |
|---|---|
| Containing State | Play |
| Contained Objects | Deep History, Initial, Tick, Tock |
| Contained Transitions | Transition, Transition, Transition |

D.2.A Initial

Initial

| Description | - |
|---|---|
| Destination | Transition ->Tick |
| Containing Region | Tick Counter |

D.2.C Tock

| Description | - |
|---|---|
| Source | *Tick* -> *Transition* |
| Destination | *Join*, *Transition* -> *Tick* |
| Containing Region | *Tick Counter* |

D.2.D Deep History

Deep History

| Description | - |
|---|---|
| Source | *Fork* |
| Destination | |
| Containing Region | |

*D.2.E Transition*

| Description | |
|---|---|
| Source | Initial |
| Destination | Tick |
| Containing Region | Tick Counter |
| Trigger List | |
| Transition Code | Description |
| | Action Code |
| Disable | FALSE |
| AutoPreAllocate | FALSE |

*D.2.F Transition*

| Description | |
|---|---|
| Source | Tick |
| Destination | Tock |
| Containing Region | Tick Counter |
| Trigger List | Increment |
| Transition Code | Description |
| | Action Code |
| Disable | FALSE |
| AutoPreAllocate | FALSE |

*D.2.G Transition*

| Description | - |
|---|---|
| Source | Tock |
| Destination | Tick |
| Containing Region | Tick Counter |
| Trigger List | Return |

*D.3 Fork*

Fork

| Description | - |
|---|---|
| Source | |
| Destination | Deep History, Green |
| Containing State | Play |

*D.4 Join*

Join

| Description | - |
|---|---|
| Source | Tock, Green |
| Destination | Transition ->Menu |
| Containing State | Play |

E Terminal

Terminal

| Description | - |
|---|---|
| Source | *Menu* ->*Transition*, *Play* ->*Transition*, *Pause* ->*Transition* |
| Containing Region | |

F Transition

| Description | - |
|---|---|
| Source | *Menu* |
| Destination | *Play* |
| Containing Region | *Main Diagram* |
| Trigger List | Play |

G Transition

| Description | - |
|---|---|
| Source | *Play* |
| Destination | *Menu* |
| Containing Region | *Main Diagram* |
| Trigger List | Menu |

| H Transition | | |
|---|---|---|
| Description | - | |
| Source | Menu | |
| Destination | Terminal | |
| Containing Region | Main Diagram | |
| Trigger List | Stop | |
| Transition Code | Description | |
| | Action Code | Inputs |
| | | Outputs → Stopped — Outputs.Current Activity |
| | Disable | FALSE |
| | AutoPreAllocate | FALSE |

I Transition

| Description | - | | |
|---|---|---|---|
| Source | Play | | |
| Destination | Terminal | | |
| Containing Region | Main Diagram | | |
| Trigger List | Stop | | |
| Transition Code | Description | | |
| | Action Code | [Inputs] | |
| | | [Outputs]———[Stopped]———[Outputs.Current Activity] | |
| | Disable | FALSE | |
| | AutoPreAllocate | FALSE | |

J Transition

| Description | - |
|---|---|
| Source | *Initial* |
| Destination | *Menu* |
| Containing Region | *Main Diagram* |
| Trigger List | |

K Transition

| Description | - |
|---|---|
| Source | *Play* |
| Destination | *Pause* |
| Containing Region | *Main Diagram* |
| Trigger List | *Pause* |

L Transition

| Description | - |
|---|---|
| Source | *Pause* |
| Destination | *Concurrent* |
| Containing Region | *Main Diagram* |
| Trigger List | *Play* |

US 9,047,168 B2

AUTOMATICALLY GENERATING DOCUMENTATION FOR A DIAGRAM INCLUDING A PLURALITY OF STATES AND TRANSITIONS

FIELD OF THE INVENTION

The present invention relates to the field of statecharts, and more particularly to a system and method for automatically generating documentation for a diagram including a plurality of states and transitions.

DESCRIPTION OF THE RELATED ART

Diagrams representing finite state machines (FSMs) have become an increasingly popular way to model and understand systems. Examples include State diagrams and Harel statecharts (referred to herein as statecharts). State diagrams classically include a series of states, state transitions, events, and actions. During execution of such diagrams, a state may transition from one state to another in response to an event. The transition taken may be determined by evaluating conditions associated with each of the specified state transitions. When the conditions for a transition are true, the transition may occur. Additionally, actions may be executed when states are entered or exited (e.g., according to the transitions), in response to a trigger, and/or at other times. In general, state diagrams do not allow for multiple states to be concurrently active.

Statecharts, in contrast, do allow for multiple states to be concurrently active. For example, in statecharts, a superstate may include a plurality of substates that may be concurrently active when the superstate is active. Generally, statecharts and state diagrams may become complicated or hard to understand. Correspondingly, it may be desirable to provide users a way to understand or interpret statecharts.

SUMMARY OF THE INVENTION

Various embodiments are presented below of methods for automatically generating documentation of a diagram including states and transitions.

A first diagram may be received or stored. The first diagram may specify a plurality of states and a plurality of transitions between the states and may also visually specify first functionality, e.g., which may be performed when the first diagram is executed.

User documentation may be automatically generated for the first diagram based on the first diagram. The user documentation may describe the first diagram (e.g., the first functionality provided by the first diagram, possibly when executed), and more specifically may describe the plurality of states and the plurality of transitions of the first diagram. Similarly, the user documentation may describe one or more inputs, state data, or outputs of the first diagram, e.g., types of the inputs, state data, and outputs in the first diagram. In further embodiments, the first diagram may include triggers, e.g., for one or more of the transitions or for reactions configured within one or more states of the first diagram, and the user documentation may describe the triggers. Additionally, the user documentation may indicate the configuration properties of the statechart, such as an execution target (e.g., a desktop computer system, a real time target, a programmable hardware element (e.g., an FPGA), etc.) for the first diagram.

In various embodiments, generating the documentation may include analyzing information corresponding to each state of the first diagram and generating user documentation for each state based on the analysis. Similarly, the generation may include analyzing information corresponding to each transition and generating user documentation for each transition based on the analysis. Similar methods may apply to each element of the first diagram.

The user documentation may include one or more markup files (e.g., eXtensible Markup Language (XML) or hyper-text transfer protocol (HTTP) files) and/or one or more images (e.g., corresponding to diagrams, subdiagrams, and/or other elements of the first diagram). In some embodiments, the user documentation may include one or more content files and one or more template files. The template files may be configurable or changeable to modify the appearance of the user documentation.

Automatic generation of the user documentation may be performed without manual user input specifying the user documentation, but may be performed in response to user input, e.g., invoking the automatic generation of the user documentation. After generation, the user documentation may be provided over a network, stored in a memory medium, displayed on a display, etc.

The method described above may be implemented using various systems, such as a computer system including a processor and memory. The method may also be implemented as program instructions (e.g., a computer program) stored on a memory medium, where the program instructions are executable to perform the method.

BRIEF DESCRIPTION OF THE DRAWINGS

A better understanding of the present invention can be obtained when the following detailed description of the preferred embodiment is considered in conjunction with the following drawings, in which:

FIGS. 6-41 are illustrative portions of an exemplary documentation generated according to an embodiment of the method of FIG. 3.

Figure 1A:
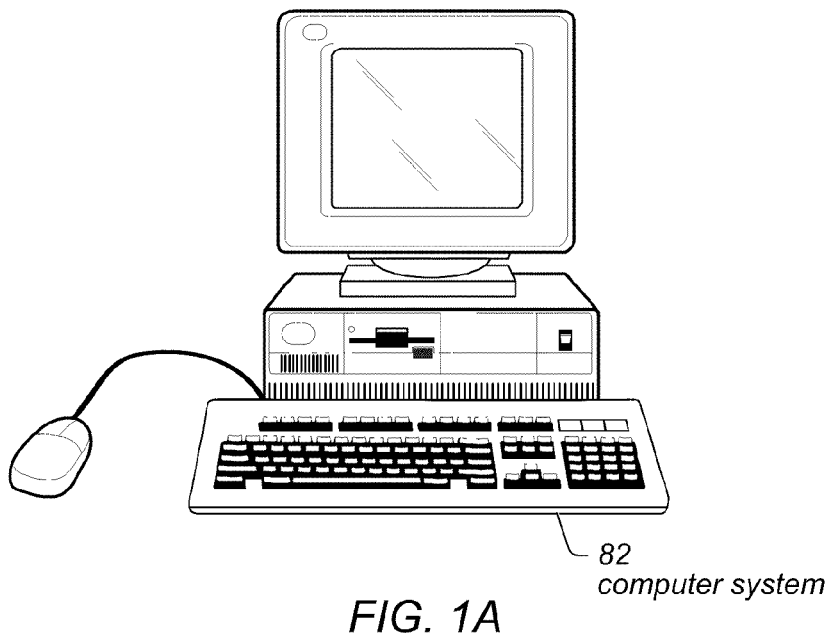
FIG. 1A illustrates a computer system operable to execute a statechart according to an embodiment of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference

The following references are hereby incorporated by reference in their entirety as though fully and completely set forth herein:

U.S. Publication 2007/0214427, titled "Automatic Generation of Documentation for Specified Systems", published on Sep. 13, 2007.

U.S. provisional application Ser. No. 60/913,028 titled "Configuring and Debugging a Statechart" filed Apr. 20, 2007, whose inventors were Nicholas G. Neumann and Toga Hartadinata.

U.S. Pat. No. 4,914,568 titled "Graphical System for Modeling a Process and Associated Method," issued on Apr. 3, 1990.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Pat. No. 7,200,838 titled "Method for Automatically Generating a Graphical Program in Response to a State Diagram," filed Dec. 21, 2000.

U.S. Patent Application Publication No. 20010020291 (Ser. No. 09/745,023) titled "System and Method for Programmatically Generating a Graphical Program in Response to Program Information," filed Dec. 20, 2000, which issued as U.S. Pat. No. 7,210,117 on Apr. 24, 2007.

TERMS

The following is a glossary of terms used in the present application:

Memory Medium—Any of various types of computer accessible memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Graphical Program—A program comprising a plurality of interconnected blocks or icons, wherein the plurality of interconnected blocks or icons visually indicate functionality of the program.

The following provides examples of various aspects of graphical programs. The following examples and discussion are not intended to limit the above definition of graphical program, but rather provide examples of what the term "graphical program" encompasses:

The blocks in a graphical program may be connected in one or more of a data flow, control flow, and/or execution flow format. The blocks may also be connected in a "signal flow" format, which is a subset of data flow.

Exemplary graphical program development environments which may be used to create graphical programs include LabVIEW®, DasyLab™, DiaDem™ and Matrixx/SystemBuild™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks or icons that visually indicate operation of the model or block diagram; exemplary graphical modeling environments include Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks are often referred to as the block diagram portion of the graphical program.

Block—In the context of a graphical program, an element that may be included in a graphical program. A block may have an associated icon that represents the block in the graphical program, as well as underlying code or data that implements functionality of the block. Exemplary blocks include function blocks, sub-program blocks, terminal blocks, structure blocks, etc. Blocks may be connected together in a graphical program by connection icons or wires.

The blocks in a graphical program may also be referred to as graphical program nodes or simply nodes.

Wire—a graphical element displayed in a diagram on a display that connects icons or nodes in the diagram. The diagram may be a graphical program (where the icons correspond to software functions), a system diagram (where the icons may correspond to hardware devices or software functions), etc. The wire is generally used to indicate, specify, or implement communication between the icons. Wires may represent logical data transfer between icons, or may represent a physical communication medium, such as Ethernet, USB, etc. Wires may implement and operate under various protocols, including data flow semantics, non-data flow semantics, etc. Some wires, e.g., buffered data transfer wires, may be configurable to implement or follow specified protocols or semantics.

Wires may indicate communication of data, timing information, status information, control information, and/or other information between icons. In some embodiments, wires may have different visual appearances which may indicate different characteristics of the wire (e.g., type of data exchange semantics, data transfer protocols, data transfer mediums, and/or type of information passed between the icons, among others).

Where wires are displayed in state diagrams or statecharts, the wires may indicate transitions between states that are represented as state icons in the state diagram or statechart.

Graphical Data Flow Program (or Graphical Data Flow Diagram)—A graphical program or diagram comprising a plurality of interconnected blocks, wherein at least a subset of the connections among the blocks visually indicate that data produced by one block is used by another block. A LabVIEW VI is one example of a graphical data flow program. A Simulink block diagram is another example of a graphical data flow program.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input the by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Statechart—A diagram that visually indicates a plurality of states and transitions between the states. The diagram comprises state icons connected by wires, where the state icons represent states and the wires represent transitions between the states.

One or more of the state icons may represent a hierarchical state, where a hierarchical state is a state that includes one or more sub-states. For example, a statechart may include a state (a superstate) which includes states (substates). The substates may be AND states (e.g., parallel or concurrently active states) or OR states (e.g., states which are not concurrently active). The statechart may also include pseudostates (e.g., forks, joins, and/or junctions).

The statechart may be represented in the memory of the computer system as data structures and/or program instructions. The representation of the statechart stored in memory corresponds to the diagram and is either 1) executable; 2) operable to be converted to an executable program; or 3) interpretable, to perform the functionality indicated by the diagram.

A "State Diagram" is a type of statechart which does not have hierarchical states.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

User Documentation—Documentation that is intended to be read by a user to understand operation of the diagram or resource being documented. "User Documentation" refers to documentation that is human readable and is in a human language, such as English, French, Spanish, German, etc., as opposed to a programming language used to formally specify a computer program, such as C, C++, Fortran, Java, etc.

FIG. 1A—Computer System

FIG. 1A illustrates a computer system 82 operable to implement the methods described herein. Various embodiments of a method for automatically generating documentation for a diagram including a plurality of states and transitions is described below.

As shown in FIG. 1A, the computer system 82 may include a display device operable to display the statechart as the statechart is created and/or executed. The display device may also be operable to display a graphical user interface (e.g., a data viewer or debugging GUI) of the statechart during execution of the statechart. The graphical user interface may comprise any type of graphical user interface, e.g., depending on the computing platform.

The computer system 82 may include at least one memory medium on which one or more computer programs or software components according to one embodiment of the present invention may be stored. For example, the memory medium may store one or more statecharts and/or graphical programs which are executable to perform the methods described herein. Additionally, the memory medium may store a development environment application used to create and/or execute such statecharts and/or graphical programs. The memory medium may also store operating system software, as well as other software for operation of the computer system. Various embodiments further include receiving or storing instructions and/or data implemented in accordance with the foregoing description upon a carrier medium.

Figure 1B:
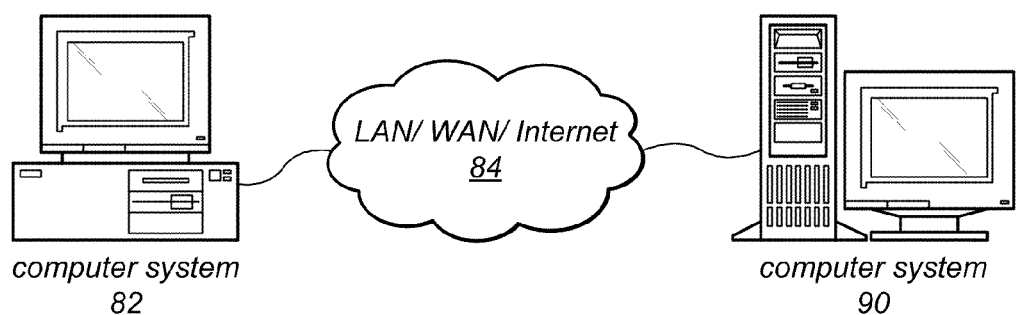
FIG. 1B illustrates a network system comprising two or more computer systems that may implement an embodiment of the present invention.

FIG. 1B—Computer Network

FIG. 1B illustrates a system including a first computer system 82 that is coupled to a second computer system 90. The computer system 82 may be coupled via a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may execute a statechart or graphical program (which may include the statechart) in a distributed fashion. For example, computer 82 may execute a first portion of the statechart and/or graphical program and computer system 90 may execute a second portion of the statechart and/or graphical program.

In one embodiment, portions of the graphical programs and/or statecharts may execute on a device. The device may include a programmable hardware element and/or may include a processor and memory medium which may execute a real time operating system. In one embodiment, the graphical program/statechart may be downloaded and executed on the device. For example, the development environment may provide support for downloading the graphical program and/or statechart for execution on the device, e.g., in a real time system.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the graphical program may be used include hardware-in-the-loop testing and rapid control prototyping, among others.

However, it is noted that the present invention can be used for a plethora of applications and is not limited to the above applications. In other words, applications discussed in the present description are exemplary only, and the present invention may be used in any of various types of systems. Thus, the system and method of the present invention is operable to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 2:
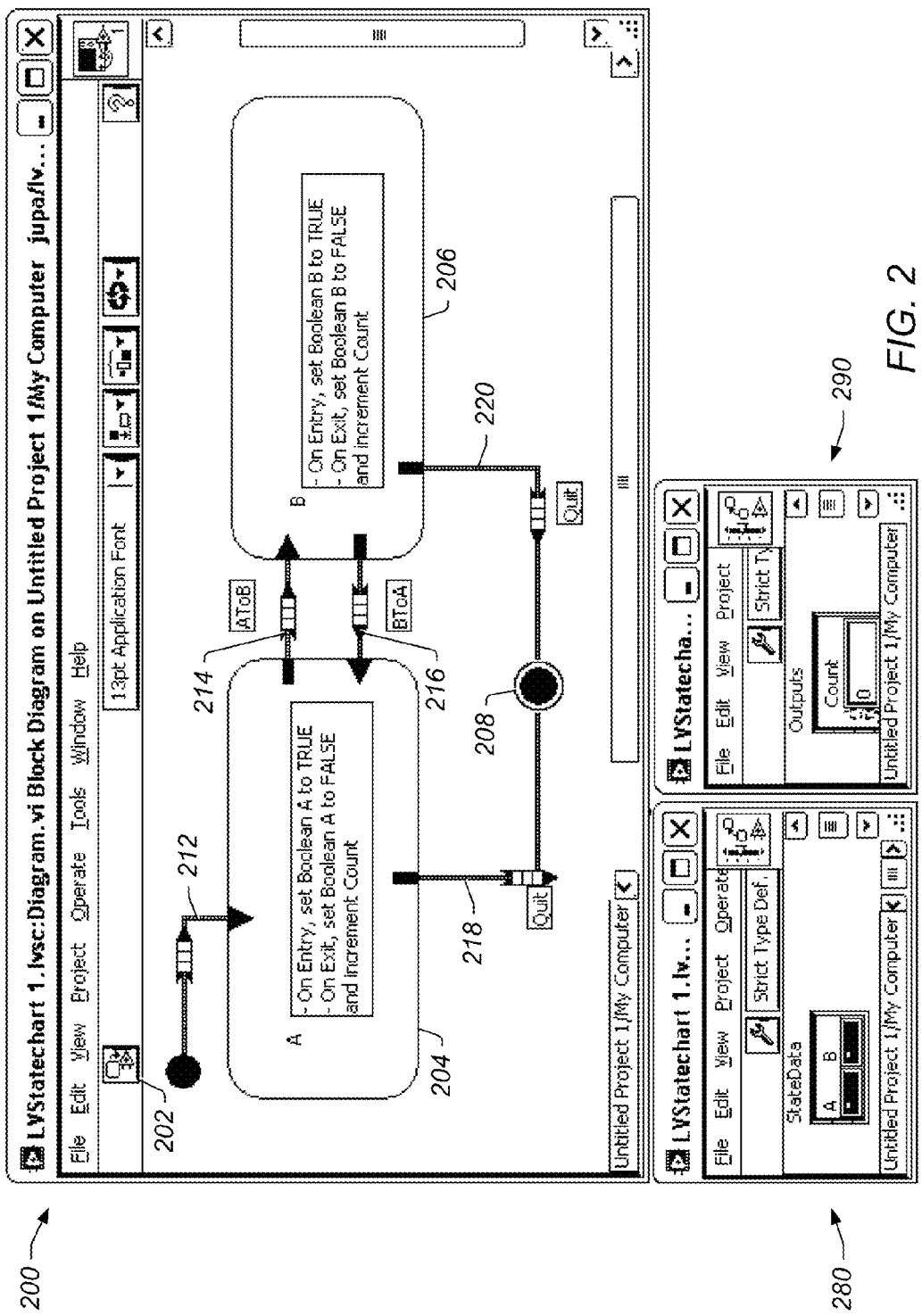
FIG. 2 illustrates an exemplary statechart developing environment with a statechart and associated graphical user interfaces according to one embodiment.

FIG. 2—Exemplary Statechart

As described above, a statechart may include a plurality of state icons connected by wires. The state icons may correspond to respective states and the wires may represent transitions between states (or to and/or from states). Thus, the statechart may include a plurality of state icons which represent states.

In some embodiments, the statechart may include at least one superstate icon which includes one or more substates. As discussed above, the one or more substates may be currently active (e.g., during execution of the statechart) when the superstate is active. Note that the substates may also be superstates. For example, the statechart may include states that themselves include statecharts. Thus, the statechart may indicate or otherwise specify a hierarchy among states.

Note that the statechart may be executable to perform first functionality, and the plurality of state icons connected by wires may indicate or visually specify that functionality. As used herein, references to execution of the statechart (or that it may be executable) refers to execution of data structures or program instructions represented by the statechart, compilation or conversion of the data structures to a form that is executable (e.g., to a graphical program), and/or interpretation. During execution, functionality represented by the statechart (e.g., the states and transitions represented in the statechart) may be performed.

Note further that the statechart performing actions during execution of the statechart may actually refer to actions that are performed by program instructions converted or compiled from the statechart performing the actions. For example, the statechart transitioning from one state to another may refer to corresponding actions being performed during execution of the program instructions created from the statechart. Additionally, where the program instructions are compiled or converted from the statechart, the program instructions may cause the statechart to change its appearance during execution (e.g., indicating current states of execution, transitions, etc.). Thus, execution of the statechart may refer to direct execution or interpretation of program instructions represented by the statechart and/or execution of program instructions compiled or derived from the statechart.

The wires connecting the state icons may represent state transitions between the states. For example, a first state (represented as a first state icon in the statechart) may be linked to a second state (represented as a second state icon) via a transition (represented as a wire). The transition may have associated triggers, guards, and/or actions associated with the transition. For example, during execution of the statechart, an event may occur and may be specified as a trigger for the transition. Accordingly, the guards (or conditions associated with the transition) may be evaluated to determine if the transitions action should be performed or executed. If the conditions are met, the action may be performed, e.g., to execute code associated with the transition. Note that the transition (represented by the wire) may have any combination of associated triggers, guards, or actions. For example, in simple cases, the wire may only have associated triggers which result in a transition from, in this example, the first state to the second state.

In various embodiments, the wire may include an affordance for configuring the transition (e.g., to specify the triggers, guards, and/or actions of the transition). The affordance may be represented as an icon displayed on or proximate to the wire. As used herein, the term "proximate" is intended to indicate an association between the two objects, which, in this case, is the icon and the first wire. In some embodiments, proximate may mean within one or more centimeters or an inch. Alternatively, proximate may mean within a given number of pixels on the display, e.g., 50 or 100 pixels. In other words, the term 'proximate' in this context means that the affordance is sufficiently close to the wire such that a user would understand an association between the affordance and the wire.

In some embodiments, the icon representing the affordance (or the wire itself) may visually indicate the associated triggers, guards, and/or actions. For example, the icon may appear as an arrow with three connected rectangles. Each rectangle may be colored or filled in to represent whether the represented transition has respective triggers, guards, and/or actions. The specific number or location of the filled in or colored rectangles may indicate which of these triggers, guards, and/or actions are associated with the transition. Thus, a single filled in rectangle may indicate that only triggers are associated with the transition. Note that these visual indications and descriptions are exemplary only and other embodiments are envisioned. For example, the affordance or wire may take on varying appearances to visually indicate the specific triggers, guards, and/or actions that are associated with the transition. Note that the icon may represent a configurable logic node or transition node. Additionally, configuration of the logic node may correspond to configuration of the wire. Further descriptions regarding configuration of the wire and/or logic node are provided below.

In some embodiments, the statechart may include pseudostates (e.g., forks, joins, and/or junctions). In some embodiments, pseudostates (or certain types thereof) may provide conditional branching for transitions in the statechart. For example, a state icon may be wired to a pseudostate in the statechart and multiple other wires may connect the pseudostate to other state icons in the diagram. Each of these wires may represent transitions with associated triggers, guards, and/or actions (as described above). Thus, the pseudostate may allow for conditioned branching of transitions in the statechart. Note that in various embodiments, transitions between states (e.g., single states, superstates, substates, or concurrently active states) and/or pseudostate may be ordered according to configured priorities (e.g., as specified by the user). These priorities may be assigned using explicit specification (e.g., using labels) or implicit specification (e.g., using orientation or directionality of the wires in the statechart).

During execution, the statechart may react to different events. Each of the states and transitions (among other elements of the statechart) may react to different events during execution of the statechart. In one embodiment, a first state may transition to a second state in response to an event. This may occur, for example, where the first state has a transition whose trigger (possibly among a plurality of triggers) is the event. In some embodiments, the transition may have "guards" or conditions which determine whether or not the transition should occur. If the guards are satisfied (i.e., if the conditions are met), the first state may exit (and possibly execute an action associated with exiting of that state), the transition may occur (and similarly execute associated actions), and the second state may be entered. Actions may then be taken based on the entrance of the second state (which itself is an event). However, it should be noted that actions may be taken even when states are not entered or exited. For example, a state may perform an action in response to a trigger without an entrance or exit of that state. Thus, statecharts may be a reactive programming paradigm in which actions are taken in response to events. Note that multiple actions or transitions may occur in response to events. In some embodiments, as indicated above, the transitions or actions may be prioritized, which may be specified implicitly or explicitly, e.g., by a user. Thus, statecharts may execute and perform actions in response to events.

FIG. 2 illustrates an exemplary statechart in a statechart development environment. As shown, the statechart development environment may include a statechart window 200 which shows the statechart. Additionally, one or more graphical user interfaces (GUIs) that are associated with the statechart may be displayed. In this case, the statechart has two associated GUIs 280 and 290. GUI 280 corresponds to state data and may display an indicator, e.g., during execution of the statechart, which indicates the current active state. GUI 290 includes a count output indicator which may show the current count value for the statechart, e.g., during execution of the statechart. As shown, the statechart includes state icons representing states of the statechart. As shown, the statechart includes a state icon 202 which represents an initial state, state icon 204 which represents state A, state icon 206 which represents state B, and a state icon 208 which represents an ending state. As indicated by the text displayed in the states, Booleans associated with each state are turned to TRUE or FALSE when the state is entered or exited respectively. Additionally, a count value is increased every time a state is exited. As described above, these values are displayed in the GUIs 280 and 290.

Furthermore, the statechart includes a plurality of transitions which are indicated by wires. As shown, wire 212 indicates a transition from the initial state to state A, wire 214 indicates a transition from state A to state B, wire 216 indicates a transition from state B to state A, wire 218 indicates a transition from state A to the ending state, and wire 220 indicates a transition from state B to the ending state. Each wire includes an affordance for configuring the wire. In some embodiments, this affordance may be referred to as a logic node or transition node. In various embodiments, configuring the wire and/or configuring the logic node displayed on the wire may refer to the same action of configuring triggers, guards, and/or actions for the wire. Further descriptions regarding configuration of the wires/transitions represented by the wires are provided below. As also shown, each wire or transition may have an associated label displayed proximate to the wire or logic node of the wire.

Thus, FIG. 2 illustrates an exemplary statechart window which includes a statechart and GUIs which may display data regarding the statechart (e.g., during execution of the statechart).

Figure 3:
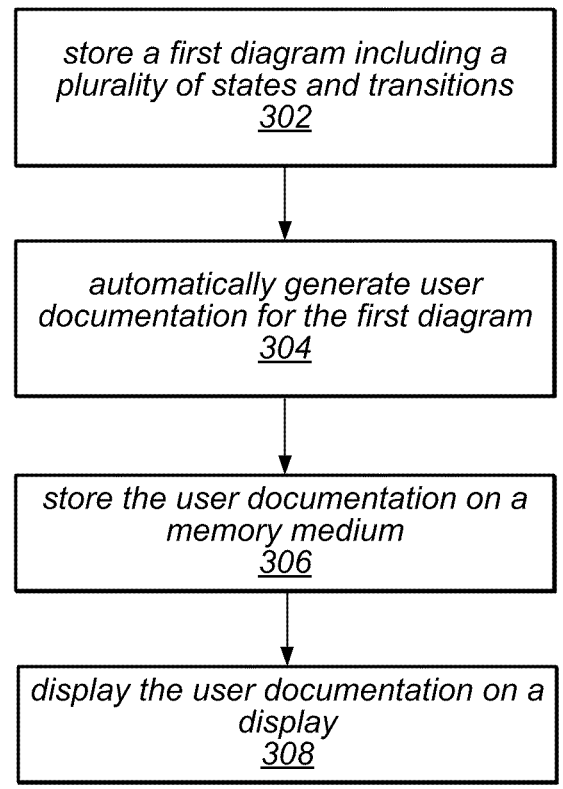
FIG. 3 is a flowchart diagram illustrating one embodiment of a method for automatically generating documentation for a diagram including states and transitions, according to one embodiment.

FIG. 3—Automatic Generation of Documentation for a Statechart

FIG. 3 illustrates a method for automatically generating documentation for a diagram including a plurality of states and transitions. The method shown in FIG. 3 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 302, a first diagram including a plurality of states and transitions may be received or stored. The first diagram may visually indicate or be executable by a computer (e.g., the computer system 82) to perform first functionality. Additionally, in some embodiments, the first diagram may be included as a node in a graphical program. As described above, the first diagram may include a plurality of state icons connected by wires or lines, where the state icons represent states and the wires represent transitions between the states. As also indicated above, the first diagram may have hierarchical relationships in states. In other words, the first diagram may include superstates which include substates.

Figure 4:
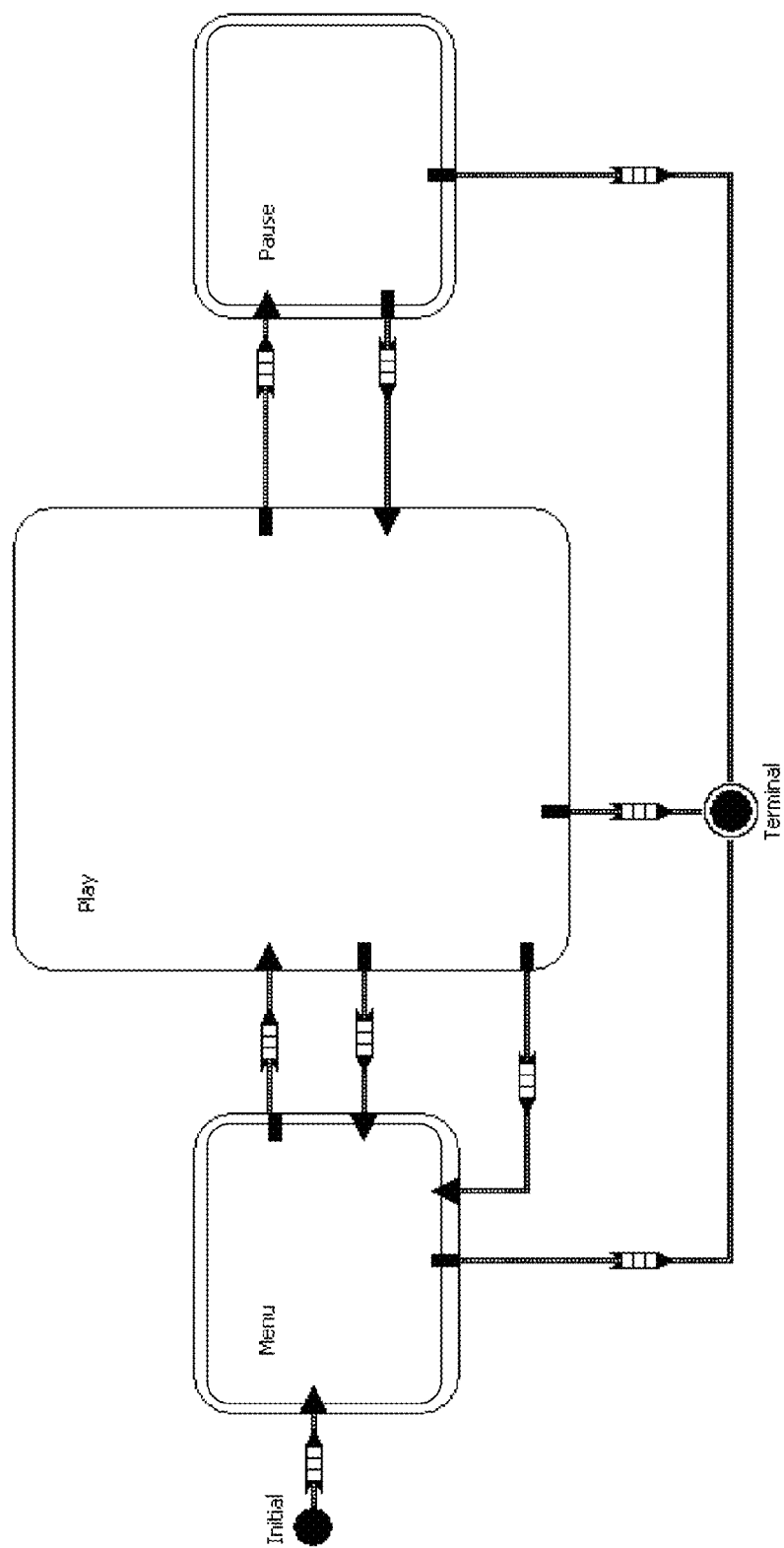
FIG. 4 illustrates an exemplary diagram, according to one embodiment.

FIG. 4 illustrates an exemplary first diagram. As shown, the diagram includes a plurality of states and transitions. As shown, the first diagram may include a plurality of states (initial, menu, play, pause, etc.), a plurality of transitions between the states, and guards and conditions for each of the transitions. The diagram may include one or more subdiagrams (e.g., for one or more of the states of the first diagram). As described below, documentation may be automatically generated for such a diagram.

Note that the first diagram may be received or displayed in response to user input. In various embodiments, the diagram, e.g., a statechart or state diagram, may have been previously created or may be created or displayed on a display, e.g., of the computer system 82. For example, the first diagram may be displayed after a user has chosen to open the first diagram (e.g., where the first diagram has already been created). Alternatively, the first diagram may be displayed during or after creation of the first diagram. The first diagram may be created manually or automatically, as desired. For example, the first diagram may be created or assembled by the user arranging on a display a plurality of state icons and then connecting the state icons to create the first diagram. In response to the user assembling the first diagram, data structures may be created and stored which represent the first diagram.

Alternatively, the user may provide textual input (e.g., to the development environment) and a first diagram may be created based on the textual input. The textual input may fully specify the first diagram or may partially specify the first diagram. Partially specifying the first diagram may include specifying desired functionality and/or portions of the states/transitions of the first diagram. In one embodiment, the user may provide input to a GUI or series of GUIs (e.g., in a wizard) in order to specify the first diagram. The first diagram may be automatically created or displayed in response to receiving the user input. Note that automatic creation of the first diagram does not require user input manually assembling state icons and wires (e.g., according to the methods described above). Thus, following descriptions from above, the user may provide input specifying functionality and/or portions of the first diagram, and the first diagram may be automatically created and displayed in response to the user input. Similar descriptions regarding the automatic creation of graphical programs and/or state diagrams can be found in various ones of the documents incorporated-by-reference above.

However, it should be noted that instead of receiving the first diagram itself, information regarding or otherwise specifying the first diagram may instead be received. For example, data structures or files describing the first diagram may be received instead of the first diagram itself. Correspondingly, the descriptions provided below may be based on the information of the first diagram instead of the first diagram itself.

In 304, user documentation for the first diagram may be automatically generated, e.g., in response to user input. The user documentation may be based on the received first diagram or information describing the first diagram, as desired. Automatic generation of the user documentation is performed without manual user input specifying the user documentation. Thus, while automatic generation of the user documentation may be performed in response to some user input, e.g., invoking the generation of the user documentation, the actual generation process itself is not performed manually by the user, but is instead performed in an automatic manner by software, without the user having to manually specify or create the documentation.

Figure 5A:
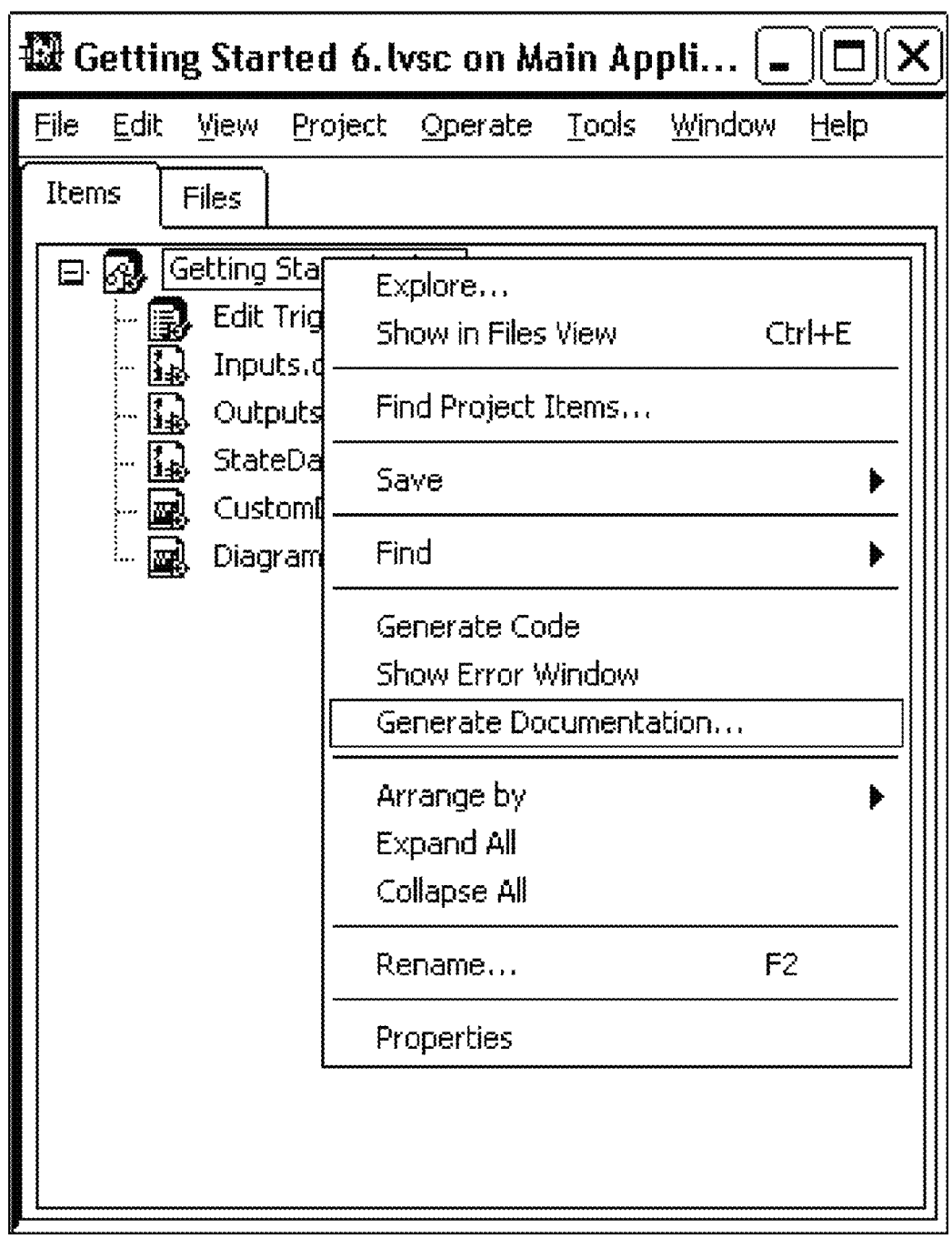
FIGS. 5A-5C are exemplary screen shots corresponding to a method for invoking the automatic generation, according to one embodiment.
Figure 5B:
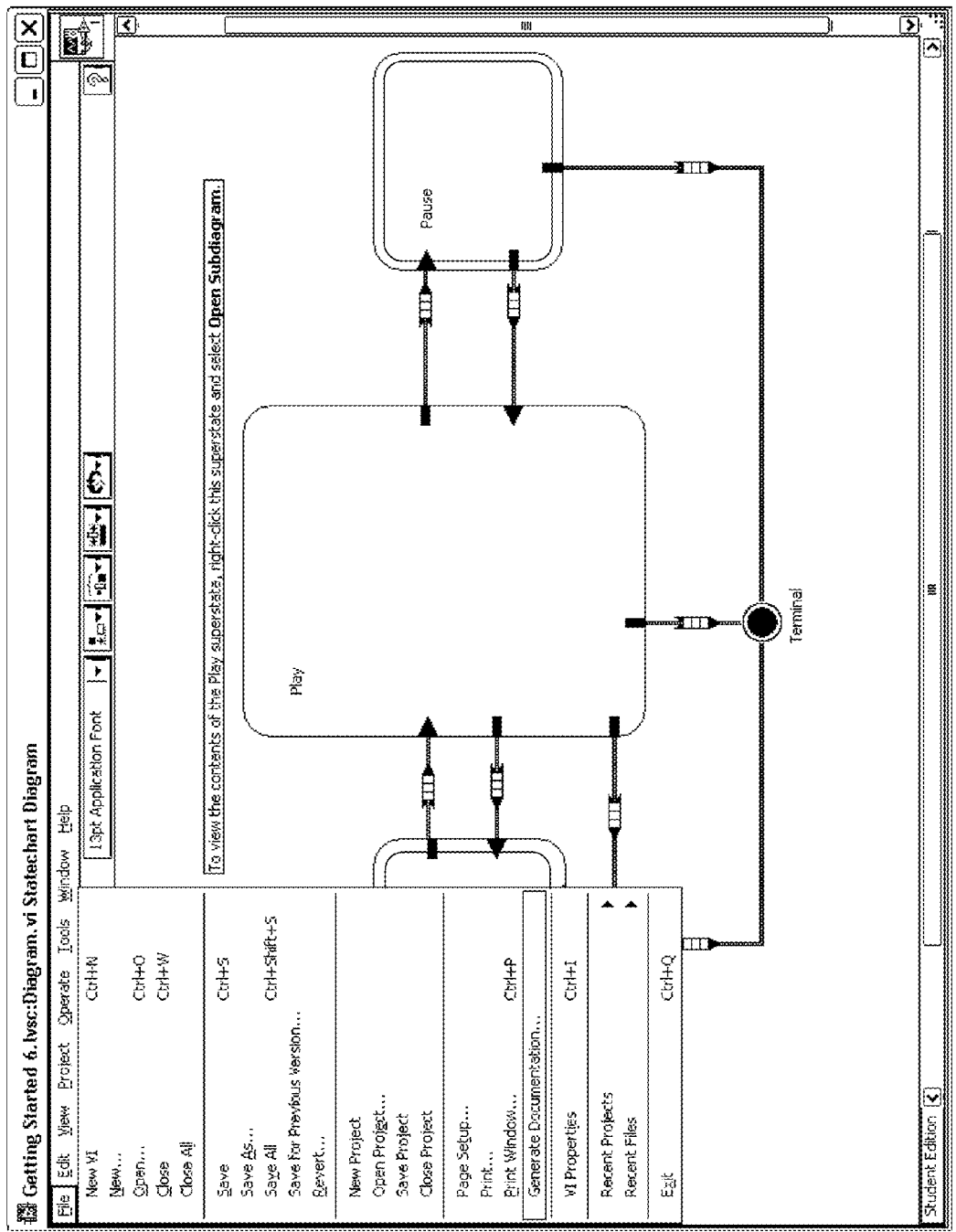
Figure 5C:
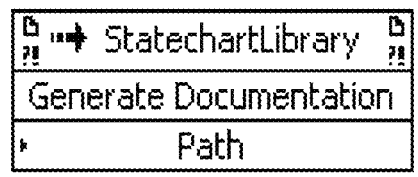

FIGS. 5A-5C illustrate various methods for providing input to invoke automatic generation of the user documentation. As shown in FIG. 5A, a user can invoke automatic generation of the documentation by selecting (e.g., right-clicking) a statechart library, e.g., in a project explorer or file explorer, and select a "generate documentation" option. Alternatively, or additionally, as shown in FIG. 5B, a user may select "generate documentation" from a selection menu, e.g., a file menu. Such a selection could be made inside of a graphical programming development environment, e.g., for creating the first diagram. In further embodiments, shown in FIG. 5C, the user may select "generate documentation" using a server API. Note that other methods for invoking automatic generation of documentation are envisioned other than those shown in FIGS. 5A-5C.

The user documentation may describe the plurality of states and the plurality of transitions of the first diagram. For example, the user documentation may describe each of the states and each of the transitions, e.g., in a separate section for each particular transition and state, although other embodiments are envisioned. In some embodiments, automatically generating the user documentation may correspondingly include analyzing information corresponding to each state, and generating the user documentation for each state based on the analysis. Similarly, information corresponding to each transition may be analyzed, and user documentation for each transition may be generated based on the analysis. Additionally, in some embodiments, the contents and configuration of each stat and transition may be analyzed and displayed. For example, some states or transitions (among other possible elements) may include graphical dataflow code (or other types of code) that defines the behavior of each state or transition. Accordingly, such code may be analyzed and/or included in the user documentation.

The user documentation may describe various other elements of the documentation. As used herein, "elements" of the first diagram may refer to any item (e.g., visually represented item) which has separate functionality or visually represents separate functionality of the first diagram. Thus, the user documentation may describe all or at least a subset of the elements of the first diagram. For example, the user documentation may describe various elements, including, but not limited to substates, pseudostates, superstates, subdiagrams, regions, joins, junctions, forks, initials, terminals, deep history, shallow history, etc. As one specific example, the first diagram may include one or more inputs, each of which may have a specific type. Accordingly, the user documentation may describe each of the inputs and outputs, the types present in these inputs and outputs, or the types used in the first diagram in general. Additionally, the first diagram may include one or more triggers for the one or more transitions, and the user documentation may describe the transitions or the triggers (e.g., separately, as a group, as subgroups, etc.). As indicated above (e.g., in describing FIG. 2), the first diagram may include various guards for the transitions, and/or other elements, any of which may be described in the user documentation.

Similar analysis methods as used above regarding states and transitions may be applied to each element of the first diagram described in the user documentation. For example, for each of the descriptions of the elements described herein, the user documentation may indicate, e.g., using graphics and/or text, properties or general functionality of each of the elements. These descriptions may be retrieved from the first diagram (e.g., metadata of the first diagram) or may be determined based on analysis. In further embodiments, a look-up table may be used to retrieve corresponding text or images based on the analysis of the elements of the first diagram.

The user documentation may be generated according to any of various methods. For example, the user documentation may be generated by traversing the first diagram. In one embodiment, the traversal may include beginning at a root level and selecting a first element of at the root level. Accordingly, the element may be analyzed and data may be generated for the element. Each element comprised in the element may then be analyzed and documented (e.g., if the current element is a state, then a region within the state may be analyzed and documented). Once an element is completed, a new element on the same level may be selected, and may be documented accordingly. The traversal may be depth first or breadth first, according to various embodiments.

Additionally, the user documentation may indicate the execution target for the first diagram and/or which types of execution targets the first diagram may be executed on. For example, the first diagram may include elements which do not allow the first diagram to be executed on various targets, e.g., programmable hardware elements, real time targets, etc.

In further embodiments, the user documentation may describe the general functionality of the first diagram, e.g., the first functionality visually represented by the first diagram. In order to describe the general functionality of the first diagram, the method may include analyzing the first diagram to determine its functionality. For example, the first diagram may be compared to other diagrams whose purpose or functionality is known and then determine the functionality based on that comparison. Alternatively, the functionality may be determined de novo, without relying on previous diagrams or information. In further embodiments, the general description may be retrieved from meta data of the first diagram, e.g., which may have been provided from a user, e.g., during creation of the first diagram.

Additionally, the user documentation may include images, e.g., of each element of the first diagram. Thus, the user documentation may include an image of the first diagram, sub-diagrams, states, pseudostates, superstates, substates, transitions, guards, triggers, and/or any of the elements described in the user documentation. In some embodiments, every described element in the first diagram may have a corresponding image for illustration, although other embodiments are also envisioned where only important or displayable elements have corresponding images.

The user documentation may be generated according to various different formats. For example, the user documentation may be generated as one or more markup language files, e.g., eXtensible Markup Language (xml) files, hyper-text transfer protocol (HTTP) files, etc. The documentation may also include one or more image files specifying the images described above. Additionally, the user documentation may include hyperlinks to relevant related portions of the diagram. For example, containing objects and contained objects may include hyperlinks to visit information regarding those containing or contained objects. Similarly, hyperlinks may be used to view information regarding a transition (e.g., originating and terminating states of the transition).

In some embodiments, the user documentation may be controlled by a template file. For example, the template file could be similar to (or in fact may be) a cascading style sheet, e.g., which may modify the style (e.g., format, color, font, font size, margins, etc.) in which elements and corresponding elements are displayed. Alternatively, the template file may indicate the particular order in which documentation of the first diagram is provided (e.g., whether to describe all states first, followed by all transitions, etc., to describe them in a mixed manner (e.g., based on location in the first diagram), whether or not to describe various elements, etc.). Thus, the template file may be used to control whether, how, or where elements are described in the documentation.

As one specific embodiment, the generated documentation may include an xml file (or other markup file), a plurality of images (e.g., referenced by the xml file), one or more extensible stylesheet language transformation (xlst) files, and/or one or more XML schema definition (xsd) files. In various embodiment, the xslt file may be used to determine the appearance of the XML document and/or transform the document into another format, such as HTML. Additionally, the xsd file(s) may define the elements and attributes of the XML file, as desired. Thus, in some embodiments, the user documentation may comprise one or more content files and may be interpreted by (and/or include) one or more template files.

In 306, the user documentation may be stored on a memory medium. In various embodiments, the user documentation may be provided to a remote computer system for storage, or may stored locally, as desired. For example, a documentation server may perform the receiving of the diagram and the automatic generation of the documentation, and subsequently provide the documentation to one or more users, although other embodiments are envisioned.

In 308, the user documentation may be displayed on a display. For example, the user documentation may be displayed on one or more displays corresponding to users of the first diagram, creators of the first diagram, users wishing to understand a process represented by the first diagram, etc.

Exemplary Information in the User Documentation

The following section provides exemplary information that may be included in the User Documentation.

Statechart Description—Displays a description of the statechart. This description may be provided, e.g., by a user, in the description field of the documentation page of the Project Library Properties dialog box. This field may describe the functionality and purpose of the statechart. This text may also appear in the context help window when the cursor is moved over the statechart in the project explorer window.

Statechart Type Definitions—Displays the Input Data, Output Data, and State Data clusters of the statechart. These clusters may be defined by opening Inputs.ctl, Outputs.ctl, and StateData.ctl from the Project Explorer window.

Trigger List—Lists all triggers and groups in the statechart and the groups to which they belong. When a transition or static reaction to react to a group is configured, any trigger in that group can initiate the associated transition or static reaction. The Trigger List may adhere to the following structure: ALL—List of all triggers/groups in the statechart; Name of Group 1—List of triggers/groups in Group 1; Name of Group N—List of triggers/groups in Group N Code Generation Properties—Displays information about the code generation of the statechart. Specify this information on the Statechart Code Generation page of the VI Properties dialog box.

Execution Target—Displays the target on which the statechart executes.

Usage—Indicates whether the statechart is synchronous or asynchronous. If you specify LabVIEW FPGA Target in the Execution Target pull-down menu, then Usage indicates whether the statechart runs in a single-cycle loop application or that the statechart can have an internal loop while running on an FPGA target.

Queue Settings—(Asynchronous statecharts only) Displays the following options relating to the trigger queue type of the statechart: Type—Displays the type of external trigger queue the statechart uses, which may be selected from the following options: LV Queue—(default) Specifies that the external queue is a LabVIEW queue; RT FIFO—(Real-Time only) Specifies that the external queue is an RT FIFO. The Queue settings may further include: Size—Displays the maximum number of triggers in the queue; Enqueue timeout in ms—Displays the amount of time, in milliseconds, the statechart waits for an open slot in the queue; Read Mode—(RT FIFO only) Displays the read behavior of the RT FIFO. The following options may be available for read mode: Polling—Specifies that the statechart continually polls the FIFO for new data or an open slot; Blocking—Specifies that the thread of the statechart sleeps while it waits, allowing other tasks in the system to execute. The queue settings may further include: Write Mode—(RT FIFO only) Displays the write behavior of the RT FIFO. The following options are available for write mode: Polling—Specifies that the statechart continually polls the FIFO for new data or an open slot; and Blocking—Specifies that the thread of the statechart sleeps while it waits, allowing other tasks in the system to execute.

Internal trigger queue size—Displays the maximum number of triggers in the internal trigger queue.

Debugging—Displays whether debugging is Enabled or Disabled for the statechart.

Reset output values after each iteration—Displays whether the statechart resets the values of the outputs.ctl type definition after every iteration of the statechart. Disable this option if you want the statechart to cache output values between iterations.

Guard or Action VI reentrancy—Displays how the statechart handles the reentrancy of the guards and actions of the statechart. This option is not valid if Enabled is specified in the Debugging pull-down menu of the Statechart Code Generation page of the Project Library Properties dialog box. The following options are available: Preallocate clone for each instance—Specifies allocation of clones of the reentrant guard or action code for every call to the reentrant code; Share clones between instances—Specifies allocation of clones of the reentrant guard or action code on-demand for each call to the reentrant code.

Statechart Diagram—Describes the properties of the pseudostates, connectors, states, transitions, and regions of the statechart. If any of the components on the statechart diagram do not have a label, generic names may be assigned to the components in the XML file. For example, if a transition node does not have a label, the name "Transition" may be applied to the transition node.

Main Diagram—Displays an image of the entire statechart diagram and lists the pseudostates, connectors, states, and transitions that the main region contains.

Image—Displays an image of the entire statechart diagram.

Contained Objects—Lists the pseudostates, connectors, and states that the main region contains.

Contained Transitions—Lists the transitions that the main region contains.

Pseudostates and Connectors—Displays an image of and the following information about each pseudostate or connector in the statechart: Image—Displays an image of the pseudostate or connector; Description—Displays a description of the pseudostate or connector. Enter this description in the Description field of the Description and Tip dialog box for the pseudostate or connector; Source—Lists the transitions into the current pseudostate or connector. Source also lists the statechart object from which each transition begins. The → symbol indicates the sequence in which a statechart moves between states and pseudostates/connectors through transitions. For example, State 1→Transition 1 indicates that the statechart moves from State 1 to the current pseudostate or connector through Transition 1. The information concerning the pseudostates and connectors may include: Destination—Lists the transitions from the current pseudostate or connector. Destination also lists the statechart object to which each transition leads. The → symbol indicates the sequence in which a statechart moves between states and pseudostates\connectors through transitions. For example, Transition 1→State 1 indicates that the statechart moves from the current pseudostate or connector to State 1 through Transition 1. The information of the pseudostate and connector may also include Containing Region—Lists the region that contains the pseudostate or connector.

States—Displays an image of and the following information about each state in the statechart:

Image—Displays an image of the state;

Description—Displays a description of the state, which may be entered in the Description field of the Description and Tip dialog box for the state;

Source—Lists the transitions into the current state or connector. Source also lists the statechart object from which each transition begins. The → symbol indicates the sequence in which a statechart moves between states and pseudostates/connectors through transitions.

Destination—Lists the transitions from the current state or connector. Destination also lists the statechart object to which each transition leads. The → symbol indicates the sequence in which a statechart moves between states and pseudostates/connectors through transitions.

Containing Region—Lists the region that contains the state;

Contained Regions—Lists the region(s) that the state contains;

Contained Objects—Lists any fork or join connectors that the state contains;

SubDiagram—Displays an image of the state if the state appears as a sub diagram.

Entry Action—Displays the following information about the entry action of the state: Description—Displays a description of the entry action. Enter this description in the Description field on the Properties page of the Configure State dialog box; Action—Displays the block diagram of the action code, whether the action code is disabled, and whether the autopreallocate option is enabled for the action code. The following information may be displayed for the Action: Code—Displays the block diagram of the action code; Disable—Indicates, when TRUE, that LabVIEW nullifies the action code on this block diagram and the action does nothing. Place a checkmark in the Disable? checkbox on the Action page of the Configure State dialog box to disable the action code; AutoPreAllocate—Indicates, when TRUE, that array and string operations may be optimized in the action code for this reaction by preallocating memory at compile time rather than dynamically allocating memory at run time. This option is only available when editing a statechart that is configured to run on an FPGA target in the Statechart Code Generation page of the Project Library Properties dialog box.

Exit Action—Displays the following information about the exit action of the state: Description—Displays a description of the exit action that may be entered in the Description field on the Properties page of the Configure State dialog box; Action—Displays the block diagram of the action code, whether the action code is disabled, and whether the autopreallocate option is enabled for the action code. The Action information may include: Code—Displays the block diagram of the action code; Disable—Indicates, when TRUE, that the action code may be nullified on this block diagram and the action does nothing. Place a checkmark in the Disable? checkbox on the Action page of the Configure State dialog box to disable the action code; AutoPreAllocate—Indicates, when TRUE, that array and string operations may be optimized in the action code for this reaction by preallocating memory at compile time rather than dynamically allocating memory at run time. This option is only available when editing a statechart that you configure to run on an FPGA target in the Statechart Code Generation page of the Project Library Properties dialog box.

Static Rxn—Displays the following information about the static reaction of the state: Description—Displays a description of the static reaction. Enter this description in the Description field on the Properties page of the Configure State dialog box; Trigger List—Lists all triggers to which the static reaction responds; Guard—Displays the block diagram of the guard code, whether the guard code is disabled, and whether the autopreallocate option is enabled for the guard code. The Guard information may include: Code—Displays the block diagram of the guard code; Disable—Indicates, when TRUE, that the guard code may be nullified on this block diagram and the guard always evaluates to TRUE. Place a checkmark in the Disable? checkbox on the Action page of the Configure State dialog box to disable the guard code; AutoPreAllocate—Indicates, when TRUE, array and string operations may be optimized in the guard code for this reaction by preallocating memory at compile time rather than dynamically allocating memory at run time. This option is only available when editing a statechart that you configure to run on an FPGA target in the Statechart Code Generation page of the Project Library Properties dialog box.

Action—Displays the block diagram of the action code, whether the action code is disabled, and whether the autopreallocate option is enabled for the action code. The Action information may include: Code—Displays the block diagram of the action code; Disable—Indicates, when TRUE, that the action code may be nullified on this block diagram and the action does nothing. Place a checkmark in the Disable? checkbox on the Action page of the configure state dialog box to disable the action code; AutoPreAllocate—Indicates, when TRUE, that array and string operations may be optimized in the action code for this reaction by preallocating memory at compile time rather than dynamically allocating memory at run time. This option is only available when editing a statechart that you configure to run on an FPGA target in the Statechart Code Generation page of the Project Library Properties dialog box.

Transitions—Displays an image of and the following information about each transition in the statechart:

Image—Displays an image of the transition.

Description—Displays a description of the transition. Enter this description in the Description field of the description and Tip dialog box for the transition.

Source—Lists the statechart object from which the current transition begins.

Destination—Lists the statechart object to which the current transition leads.

Containing Region—Lists the region that contains the transition.

Trigger List—Lists all triggers to which the transition reacts.

Transition Code—Displays the following information about the guard and action code of the transition: Description—Displays a description of the transition code. Enter this description in the Description field of the Documentation page of the Configure Transition dialog box; Guard—Displays the block diagram of the guard code, whether the guard code is disabled, and whether the autopreallocate option is enabled for the guard code. The Guard information may include: Code—Displays the block diagram of the guard code; Disable—Indicates, when TRUE, that the guard code may be nullified on this block diagram and the guard always evaluates to TRUE. Place a checkmark in the Disable? checkbox on the Guard page of the Configure Transition dialog box to disable the guard code; AutoPreAllocate—Indicates, when TRUE, that array and string operations may be optimized in the guard code for this transition by preallocating memory at compile time rather than dynamically allocating memory at run time. This option is only available when editing a statechart that you configure to run on an FPGA target in the Statechart Code Generation page of the Project Library Properties dialog box. The Transition Code information may include the following information: Action—Displays the block diagram of the action code, whether the action code is disabled, and whether the autopreallocate option is enabled for the action code. The Action information may include: Code—Displays the block diagram of the action code; Disable—Indicates, when TRUE, that LabVIEW nullifies the action code on this block diagram and the action does nothing. Place a checkmark in the Disable? checkbox on the Action page of the Configure Transition dialog box to disable the action code; and AutoPreAllocate—Indicates, when TRUE, that LabVIEW optimizes array and string operations in the action code for this transition by preallocating memory at compile time rather than dynamically allocating memory at run time. This option is only available when editing a statechart that you configure to run on an FPGA target in the Statechart Code Generation page of the Project Library Properties dialog box.

Regions—Displays an image of and the following information about each region in the statechart:

Image—Displays an image of the region.

Description—Displays a description of the region. Enter this description in the Description field of the Description and Tip dialog box for the region.

Containing State—Lists the state that contains the region.

Contained Objects—Lists the pseudostates, connectors, and states that the region contains.

Contained Transitions—Lists the transitions that the region contains.

FIGS. 6-41—Exemplary Documentation for the Statechart of FIG. 4

FIGS. 6-41 provide exemplary automatically created user documentation for the diagram illustrated in FIG. 4. Note that the documentation may be provided in the order and format as that described below and shown in the Figures, or may be arranged in a different order or manner. Additionally, any of the depictions and descriptions below may be used with any of the systems and methods described herein.

FIG. 6 illustrates an exemplary Statechart description. As shown, the Statechart description may be "For the tutorial that accompanies this example statechart, refer to the Statechart Module Tutorial Part 6: Splitting and merging Transition Segments topic in the LabVIEW help.

FIG. 7 illustrates various statechart type definitions, such as input type "Boolean", output data "current activity", and state data ("counter" and "color").

FIG. 8 illustrates an exemplary trigger list "increment, menu, pause, play, return, stop".

FIG. 9 illustrates an exemplary code generation properties table. As shown, the execution target may be "desktop", the usage may be "Asynchronous", the Queue Settings may be of type "LV Queue", size "−1", and enqueue timeout of "−1", the "internal trigger queue size" may be "10", and the reset output values after each iteration may be set to "TRUE".

Figure 10:
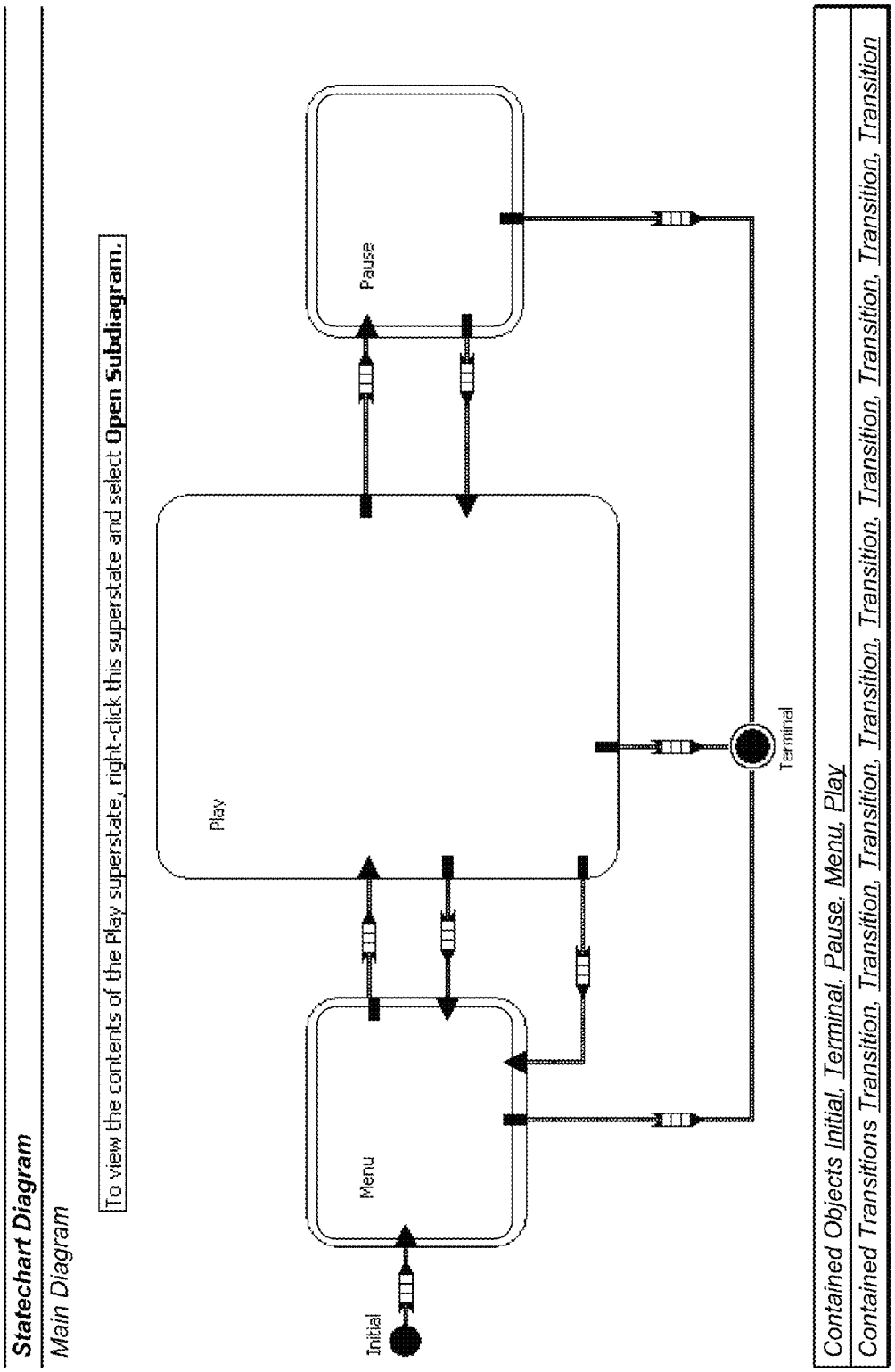

FIG. 10 illustrates the "Statechart Diagram"-"Main Diagram" portion of the documentation, which includes an image of the main diagram as well as a listing of the contained objects and contained transitions.

Figure 11:

FIG. 11 illustrates the "initial" state with its description, destination, and containing region.

Figure 12:
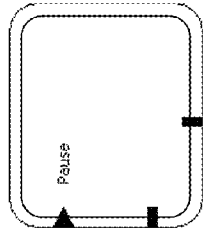

FIG. 12 illustrates the state "Pause" with a corresponding image. As shown, the documentation includes a table describing this state's description, source, destination, containing region, entry action, and exit action.

Figure 13:
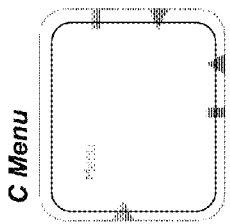
Figure 14B:
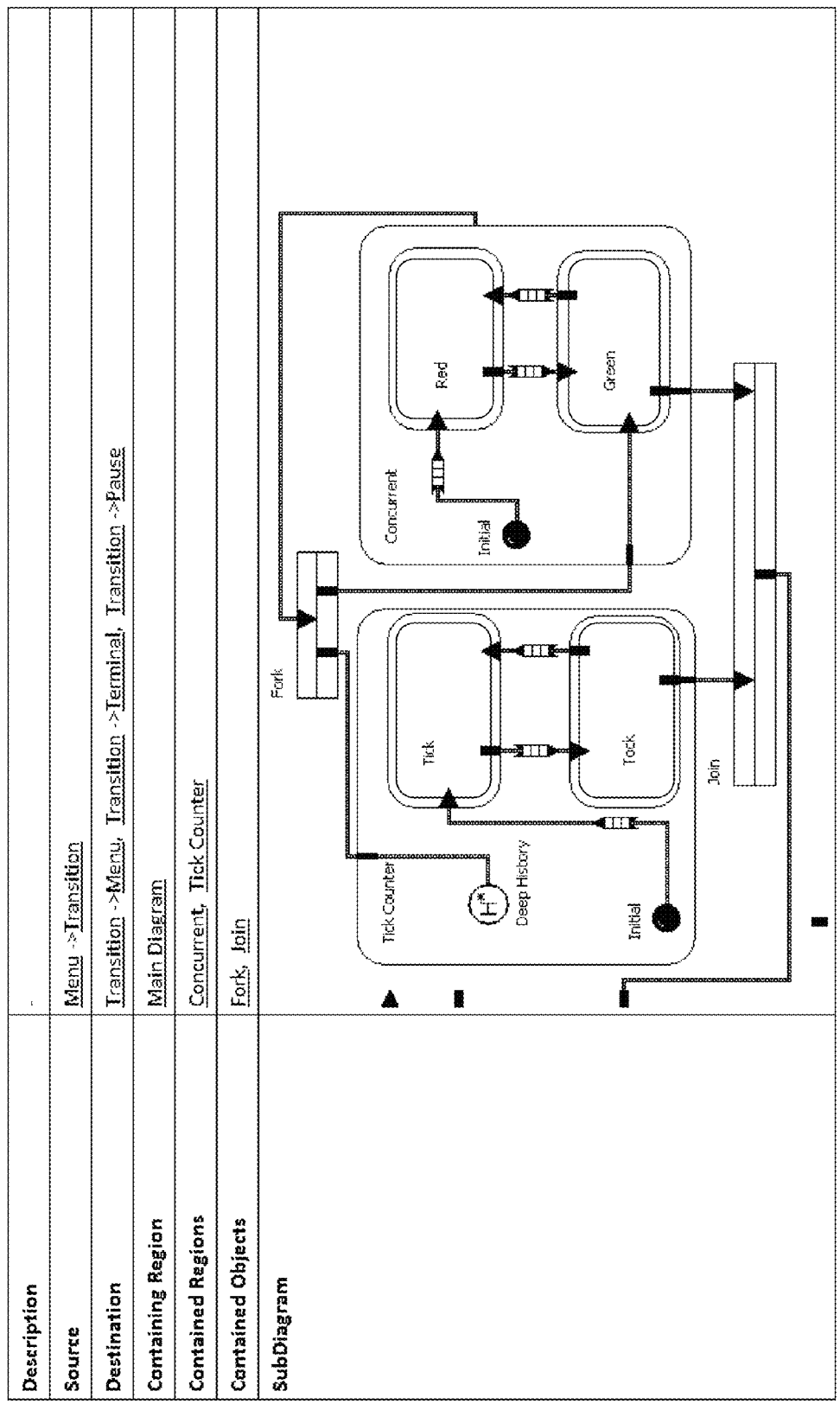
Figure 14C:
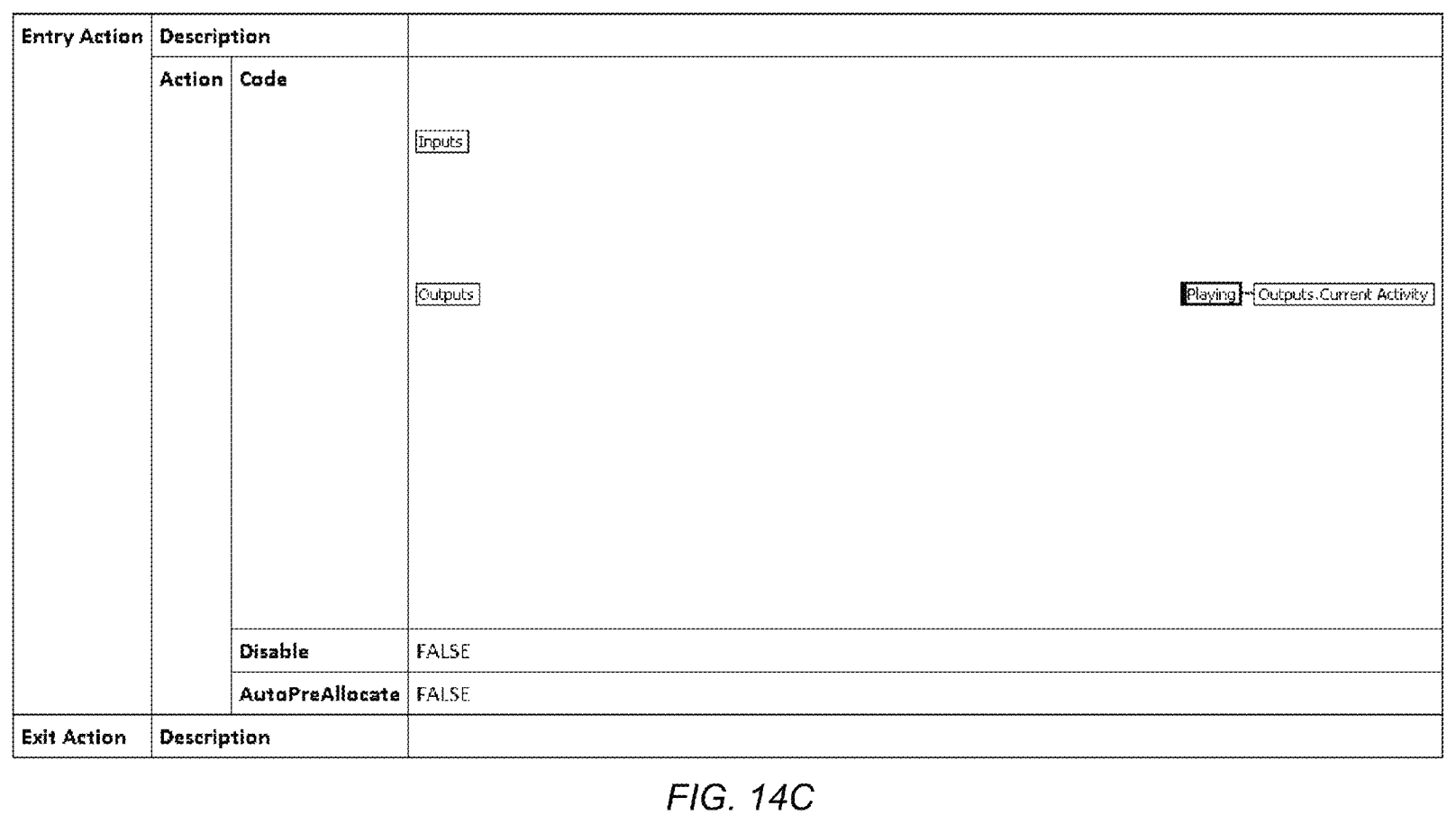
Figure 15:
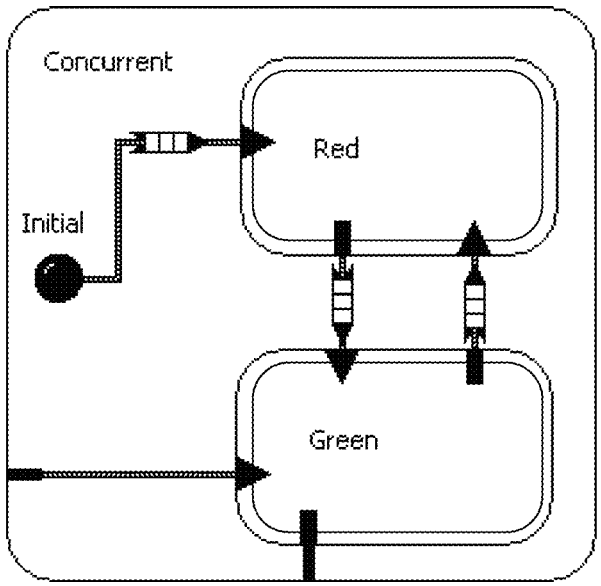
Figure 16:
Figure 17:
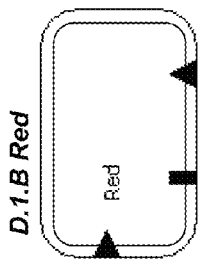
Figure 18:
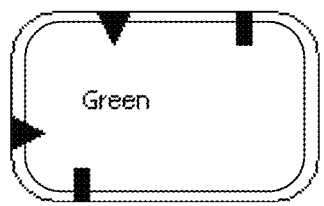
Figure 19:
Figure 20:
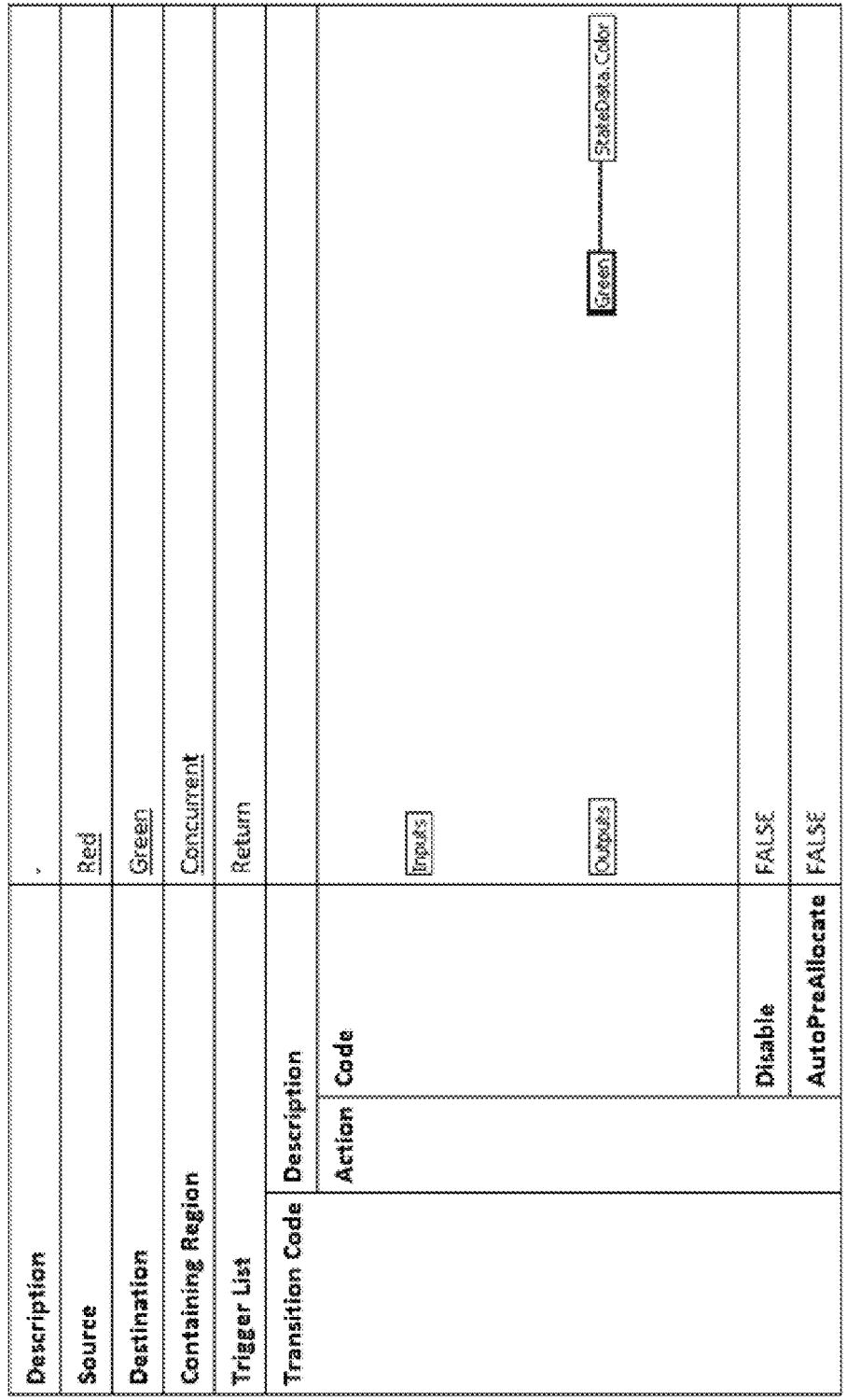
Figure 21:
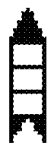
Figure 22:
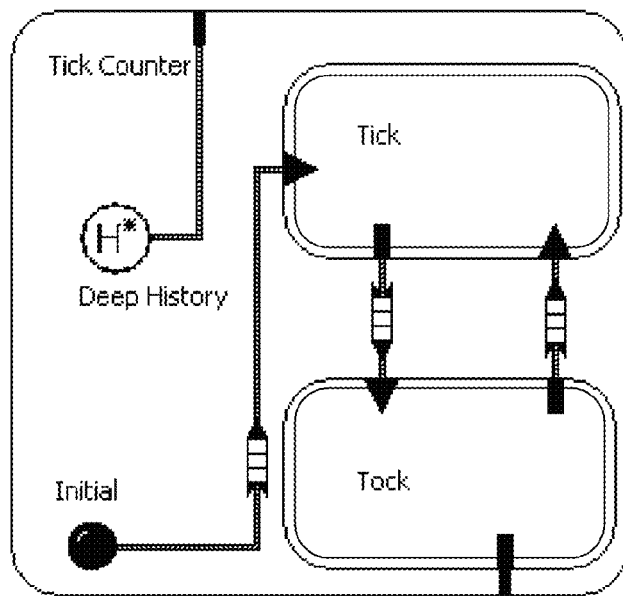
Figure 23:
Figure 24:
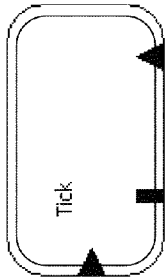
Figure 25:
Figure 26:
Figure 27:
Figure 28:
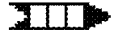
Figure 29:
Figure 30:
Figure 31:
Figure 32:
Figure 33:
Figure 34:
Figure 35:
Figure 36:
Figure 37:
Figure 38:
Figure 39:
Figure 40:
Figure 41:
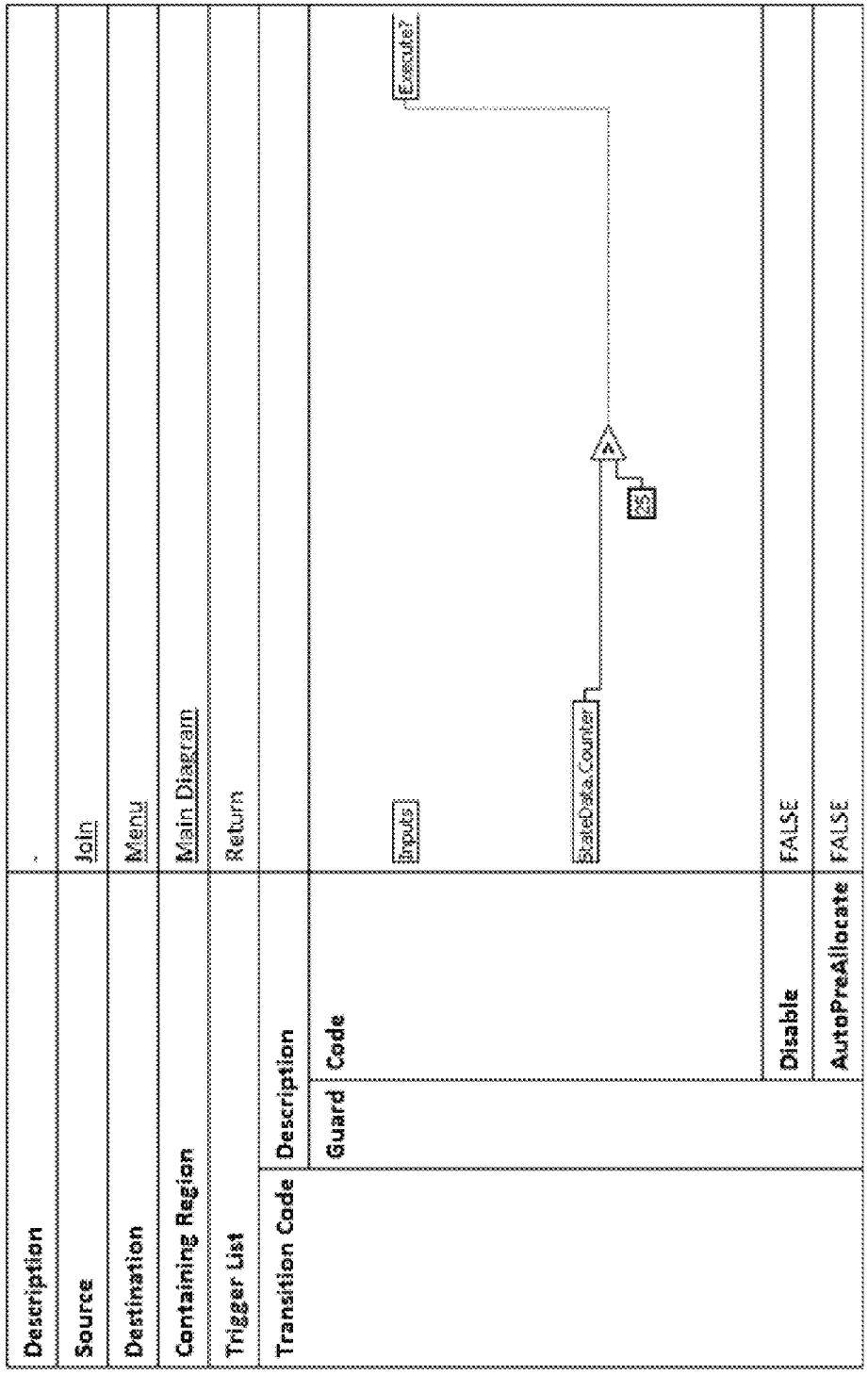

Similarly, documentation is provided for state "Menu" in FIG. 13 and "Play" in FIGS. 14A-C.

Subdiagram information is provided for state "Play" in FIGS. 15-31, which describe each element of the state "play" including transitions, forks, joins, histories, etc.

FIGS. 32-41 describe the remaining state "Terminal" and transitions associated with the "root" states of the diagram of FIG. 4. Thus, FIGS. 6-41 provide exemplary user documentation for the diagram of FIG. 4.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A non-transitory computer accessible memory medium storing program instructions executable by a processor to:
store a first diagram, wherein the first diagram specifies a plurality of states and a plurality of transitions between the states, wherein the first diagram includes a plurality of state icons, wherein each of the state icons represents one of the states, wherein the first diagram specifies first functionality;
automatically generate user documentation for the first diagram based on the first diagram, wherein the user documentation describes the first diagram, wherein in said automatically generating the user documentation, the program instructions are executable by the processor to automatically include one or more images of one or more of the state icons in the user documentation and to automatically include human language describing the plurality of states and the plurality of transitions of the first diagram in the user documentation, and wherein automatic generation of the user documentation is performed without manual user input specifying the user documentation, wherein said generating the user documentation comprises generating one or more markup language files, wherein the human language describing the plurality of states and the plurality of transitions of the first diagram is included in the one or more markup language files; and
display the user documentation on a display, wherein in said displaying the user documentation, the program instructions are executable by the processor to display the one or more images and display the human language describing the plurality of states and the plurality of transitions of the first diagram.

2. The non-transitory memory medium of claim 1, wherein said automatically generating the user documentation comprises:
analyzing information corresponding to each state;
generating user documentation for each state based on the analysis, wherein the user documentation for each state includes human language describing the state;
analyzing information corresponding to each transition; and
generating user documentation for each transition based on the analysis, wherein the user documentation for each transition includes human language describing the transition.

3. The non-transitory memory medium of claim 1, wherein at least one of the plurality of states comprises one or more substates, wherein the user documentation includes human language describing the one or more substates.

4. The non-transitory memory medium of claim 1, wherein the first diagram comprises inputs or outputs with one or more types, and wherein the user documentation describes each of the one or more types of the first diagram.

5. The non-transitory memory medium of claim 1, wherein behavior of one or more of the plurality of states and transitions is specified according to a graphical data flow language, and wherein the user documentation describes graphical data flow code specifying the behavior of the one or more of the plurality of states and transitions.

6. The non-transitory memory medium of claim 1, wherein the user documentation includes human language indicating an execution target for the first diagram.

7. The non-transitory memory medium of claim 1, wherein the first diagram is an executable diagram.

8. The non-transitory memory medium of claim 1, wherein the user documentation comprises one or more images illustrating the first diagram.

9. The non-transitory memory medium of claim 1, wherein the user documentation comprises one or more content files and one or more template files, wherein the one or more template files are configurable to modify a visual appearance of the user documentation.

10. A method, comprising:
   storing a first diagram, wherein the first diagram specifies a plurality of states and a plurality of transitions between the states, wherein the first diagram includes a plurality of state icons, wherein each of the state icons represents one of the states, wherein the first diagram specifies first functionality;
   automatically generating user documentation for the first diagram based on the first diagram, wherein the user documentation describes the first diagram, wherein said automatically generating the user documentation comprises automatically including one or more images of one or more of the state icons in the user documentation and automatically including human language describing the plurality of states and the plurality of transitions of the first diagram in the user documentation, and wherein automatic generation of the user documentation is performed without manual user input specifying the user documentation, wherein said generating the user documentation comprises generating one or more markup language files, wherein the human language describing the plurality of states and the plurality of transitions of the first diagram is included in the one or more markup language files;
   storing the user documentation on a memory medium; and
   displaying the user documentation on a display device, wherein said displaying comprises displaying the one or more images and displaying the human language describing the plurality of states and the plurality of transitions of the first diagram.

11. The method of claim 10, wherein said automatically generating the user documentation comprises:
   analyzing information corresponding to each state;
   generating user documentation for each state based on the analysis, wherein the user documentation for each state includes human language describing the state;
   analyzing information corresponding to each transition; and
   generating user documentation for each transition based on the analysis, wherein the user documentation for each transition includes human language describing the transition.

12. The method of claim 10, wherein the first diagram comprises inputs or outputs with one or more types, and wherein the user documentation describes each of the one or more types of the first diagram.

13. The method of claim 10, wherein behavior of one or more of the plurality of states and transitions is specified according to a graphical data flow language, and wherein the user documentation describes graphical data flow code specifying the behavior of the one or more of the plurality of states and transitions.

14. The method of claim 10, wherein the user documentation includes human language indicating an execution target for the first diagram.

15. The method of claim 10, wherein at least one of the plurality of states comprises one or more substates.

16. The method of claim 10, wherein the user documentation comprises one or more images illustrating the first diagram.

17. The method of claim 10, wherein the user documentation comprises one or more content files and one or more template files, wherein the one or more template files are configurable to modify a visual appearance of the user documentation.

18. A system, comprising:
   a processor;
   a display coupled to the processor; and
   a computer accessible memory medium coupled to the processor, wherein the memory medium stores program instructions executable by the processor to:
      receive a first diagram, wherein the first diagram specifies a plurality of states and a plurality of transitions between the states, wherein the first diagram includes a plurality of state icons, wherein each of the state icons represents one of the states, wherein the first diagram specifies first functionality;
      automatically generate user documentation for the first diagram based on the first diagram, wherein the user documentation describes the first diagram, wherein in said automatically generating the user documentation, the program instructions are executable by the processor to automatically include one or more images of one or more of the state icons in the user documentation and to automatically include human language describing the plurality of states and the plurality of transitions of the first diagram in the user documentation, and wherein automatic generation of the user documentation is performed without manual user input specifying the user documentation, wherein said generating the user documentation comprises generating one or more markup language files, wherein the human language describing the plurality of states and the plurality of transitions of the first diagram is included in the one or more markup language files; and
      display the user documentation on the display, wherein in said displaying the user documentation, the program instructions are executable by the processor to display the one or more images and display the human language describing the plurality of states and the plurality of transitions of the first diagram.

19. The memory medium of claim 1, wherein the program instructions are further executable by the processor to:
   display the first diagram in a graphical user interface window; and
   receive user input to the graphical user interface window selecting an option to generate the user documentation for the first diagram, wherein the program instructions are executable by the processor to perform said automatically generating the user documentation for the first diagram in response to the user input selecting the option.

20. The memory medium of claim 1,
   wherein the first diagram includes a pseudostate that provides conditional branching for transitions in the first diagram;
   wherein the user documentation includes human language describing the pseudostate.

21. The memory medium of claim 1, wherein in automatically generating the user documentation for the first diagram, the program instructions are executable by the processor to:
traverse the first diagram by selecting respective elements of the first diagram and generating respective user documentation for each selected element.

22. The memory medium of claim 1,
wherein the first diagram includes a respective graphical element representing each of the transitions between the states;
wherein in said automatically generating the user documentation, the program instructions are further executable by the processor to automatically include an image of each of the graphical elements in the user documentation.

23. The memory medium of claim 1,
wherein in said displaying the user documentation on the display, the program instructions are executable by the processor to display a first object, wherein the first object includes one or more hyperlinks for viewing information regarding the first object.

24. The memory medium of claim 1,
wherein the human language describing the plurality of states and the plurality of transitions of the first diagram comprises one or more of:
an English language description of the plurality of states and the plurality of transitions of the first diagram;
a German language description of the plurality of states and the plurality of transitions of the first diagram;
a French language description of the plurality of states and the plurality of transitions of the first diagram; or
a Spanish language description of the plurality of states and the plurality of transitions of the first diagram.

25. The memory medium of claim 1,
wherein the first diagram includes a plurality of triggers;
wherein in said automatically generating the user documentation, the program instructions are executable by the processor to automatically include, in the user documentation, information specifying the triggers;
wherein in said displaying the user documentation, the program instructions are executable by the processor to display a list of the triggers.

26. The memory medium of claim 1,
wherein in said displaying the user documentation, the program instructions are executable by the processor to display the human language regarding a first state, wherein the human language regarding the first state includes a description of the first state, a source list of transitions into the first state, and a destination list of transitions from the first state.

27. The memory medium of claim 26, wherein the human language regarding the first state further includes one or more of:
information regarding a containing region the contains the first state;
information regarding a contained region contained by the first state;
information regarding an entry action of the first state;
information regarding an exit action of the first state; or
information regarding a static reaction of the first state.

* * * * *